United States Patent
Sakagawa et al.

(10) Patent No.: US 12,337,932 B2
(45) Date of Patent: Jun. 24, 2025

(54) MOTORIZED COMPONENT AND CONTROL SYSTEM OF HUMAN-POWERED VEHICLE

(71) Applicant: SHIMANO INC., Sakai (JP)

(72) Inventors: Yuki Sakagawa, Sakai (JP); Toyoto Shirai, Sakai (JP); Satoshi Shahana, Sakai (JP); Hitoshi Takayama, Sakai (JP); Noor Ashyikkin Binti Mohd Noor, Sakai (JP)

(73) Assignee: SHIMANO INC., Sakai (JP)

( * ) Notice: Subject to any disclaimer, the term of this patent is extended or adjusted under 35 U.S.C. 154(b) by 0 days.

(21) Appl. No.: 17/993,885

(22) Filed: Nov. 24, 2022

(65) Prior Publication Data
US 2023/0159135 A1     May 25, 2023

(30) Foreign Application Priority Data

Nov. 25, 2021   (DE) ............... 10 2021 130 990.5

(51) Int. Cl.
  *B62M 25/08*    (2006.01)
  *B62J 43/30*    (2020.01)
  *B62M 6/40*     (2010.01)

(52) U.S. Cl.
  CPC .............. *B62M 25/08* (2013.01); *B62J 43/30* (2020.02); *B62M 6/40* (2013.01)

(58) Field of Classification Search
  CPC ................................ B62M 25/08; B62M 6/40
  See application file for complete search history.

(56) References Cited

U.S. PATENT DOCUMENTS

| | | | |
|---|---|---|---|
| 10,875,601 B2 | 12/2020 | Wesling | |
| 2005/0029033 A1 | 2/2005 | Rip et al. | |
| 2015/0073656 A1* | 3/2015 | Takamoto | G06F 9/02 701/1 |
| 2016/0121962 A1* | 5/2016 | Miyoshi | B62M 6/45 701/22 |
| 2016/0257370 A1* | 9/2016 | Hashimoto | B62K 23/02 |
| 2017/0008465 A1* | 1/2017 | Kasai | B62M 9/132 |
| 2017/0355412 A1* | 12/2017 | Takeshita | B62J 11/00 |
| 2018/0127042 A1* | 5/2018 | Kerbel | B62J 6/057 |
| 2018/0178870 A1* | 6/2018 | Takeshita | B62J 50/22 |

(Continued)

FOREIGN PATENT DOCUMENTS

| | | | | |
|---|---|---|---|---|
| CH | 715274 A2 * | 2/2020 | ............ | B60Q 1/085 |
| DE | 10 2016 001 937 | 9/2016 | | |

(Continued)

OTHER PUBLICATIONS

USPTO Machine Translation of the Description of TW I725227 B, Shirai, Apr. 21, 2021. (Year: 2023).*

(Continued)

*Primary Examiner* — Daniel D Yabut
(74) *Attorney, Agent, or Firm* — MORI & WARD, LLP

(57) ABSTRACT

A motorized component of a human-powered vehicle includes an electric actuator and controller circuitry configured to control the electric actuator. At least one of the electric actuator and the controller circuitry is configured to be electrically connected via an electric cable to a remotely located power source configured to supply electricity to an assist drive unit configured to assist pedaling. The motorized component is other than a rear derailleur.

14 Claims, 7 Drawing Sheets

(56) References Cited

U.S. PATENT DOCUMENTS

| | | | | |
|---|---|---|---|---|
| 2018/0257736 A1* | 9/2018 | Komatsu | .................. | B62J 45/41 |
| 2018/0257737 A1* | 9/2018 | Komatsu | ................ | B62K 25/10 |
| 2019/0118785 A1* | 4/2019 | Takayama | ............... | B60T 8/171 |
| 2019/0127018 A1* | 5/2019 | Nishino | .................... | B62L 1/02 |
| 2019/0233048 A1* | 8/2019 | Takayama | ............. | B60T 8/1706 |
| 2019/0241236 A1* | 8/2019 | Lin | ......................... | B62M 9/132 |
| 2020/0012964 A1* | 1/2020 | Shimazu | .................. | B62J 45/20 |
| 2021/0009226 A1* | 1/2021 | Yamamoto | ............. | G06N 3/006 |
| 2021/0394865 A1 | 12/2021 | Wesling | | |

FOREIGN PATENT DOCUMENTS

| | | | | |
|---|---|---|---|---|
| KR | 101896831 | B1 | * | 9/2018 |
| TW | I725227 | B | * | 4/2021 |

OTHER PUBLICATIONS

USPTO Machine Translation (retrieved from FIT database) of the Description of KR 101896831 B1, Yun, Sep. 7, 2018. (Year: 2025).*

* cited by examiner

MOTORIZED COMPONENT AND CONTROL SYSTEM OF HUMAN-POWERED VEHICLE

CROSS-REFERENCE TO RELATED APPLICATIONS

The present application claims priority under 35 U.S.C. § 119 to German Patent Application No. 10 2021 130 990.5, filed Nov. 25, 2021. The contents of German Patent Application No. 10 2021 130 990.5 are incorporated herein by reference in their entirety.

BACKGROUND

Technical Field

The present invention relates to a motorized component and a control system of a human-powered vehicle.

Background Information

A human-powered vehicle generally includes an electric device powered by an electric power supply. Such an electric device can include its own power supply. However, if the human-powered vehicle includes a plurality of electric devices which are respectively powered by a plurality of power supplies, it is hard for a user to manage the plurality of power supplies. It is preferable to share an electric power supply having greater capacity with a plurality of devices.

SUMMARY

In accordance with a first aspect of the present invention, a motorized component of a human-powered vehicle comprises an electric actuator and controller circuitry configured to control the electric actuator. At least one of the electric actuator and the controller circuitry is configured to be electrically connected via an electric cable to a remotely located power source configured to supply electricity to an assist drive unit configured to assist pedaling. The motorized component is other than a rear derailleur.

With the motorized component according to the first aspect, it is possible to share the remotely located power source with the assist drive unit. Thus, it is possible to collectively manage a power source used for the motorized component and the assist drive unit.

In accordance with a second aspect of the present invention, the motorized component according to the first aspect further comprises wireless communicator circuitry electrically connected to the controller circuitry.

With the motorized component according to the second aspect, it is possible to omit an electric cable provided between the motorized component and another component.

In accordance with a third aspect of the present invention, the motorized component according to the second aspect is configured so that at least one of the electric actuator, the wireless communicator circuitry, and the controller circuitry is configured to receive electricity from the remotely located power source via the electric cable.

With the motorized component according to the third aspect, it is possible to share the remotely located power source with the assist drive unit. Thus, it is possible to collectively manage a power source used for the motorized component and the assist drive unit while omitting an electric cable between the motorized component and another component.

In accordance with a fourth aspect of the present invention, the motorized component according to the second or third aspect is configured so that the controller circuitry is configured to control the electric actuator based on a control signal wirelessly transmitted from master wireless communicator circuitry of a master electric device.

With the motorized component according to the fourth aspect, it is possible to wirelessly operate the motorized component using the master electric device.

In accordance with a fifth aspect of the present invention, the motorized component according to the second or third aspect is configured so that the wireless communicator circuitry is configured to wirelessly transmit a slave control signal to slave wireless communicator circuitry of a slave device to control the slave device.

With the motorized component according to the fifth aspect, it is possible to wirelessly operate the slave device via the motorized component.

In accordance with a sixth aspect of the present invention, the motorized component according to any one of the second to fifth aspects further comprises a connection port to which the electric cable is configured to be detachably and reattachably connected such that the connection port is electrically connected to the at least one of the electric actuator, the wireless communicator circuitry, and the controller circuitry.

With the motorized component according to the sixth aspect, it is possible to connect the remotely located power source to the motorized component via the connection port.

In accordance with a seventh aspect of the present invention, the motorized component according to any one of the first to sixth aspects further comprises a first member, a second member movable relative to the first member, and a positioning structure configured to adjustably position the first member and the second member relative to each other.

With the motorized component according to the seventh aspect, it is possible to apply the structure of the motorized component to a device that is preferable to adjustably position two members relative to each other.

In accordance with an eighth aspect of the present invention, the motorized component according to the seventh aspect is configured so that the positioning structure is configured to position the first member and the second member relative to each other in a lock state and configured to allow the first member and the second member to move relative to each other in an adjustable state. The electric actuator is configured to actuate the positioning structure to change a state of the positioning structure between the lock state and the adjustable state. The controller circuitry is configured to control the electric actuator to actuate the positioning structure.

With the motorized component according to the eighth aspect, it is possible to apply the structure of the motorized component to a device that is preferable to have the lock state and the adjustable state.

In accordance with a ninth aspect of the present invention, the motorized component according to the seventh or eighth aspect is configured so that the first member extends in a longitudinal direction The second member extends in the longitudinal direction. The first member and the second member are movable relative to each other in the longitudinal direction. The positioning structure is configured to position the first member and the second member relative to each other in the longitudinal direction in the lock state and configured to allow the first member and the second member to move relative to each other in the longitudinal direction in the adjustable state.

With the motorized component according to the ninth aspect, it is possible to apply the structure of the motorized component to a device that is preferable to adjustably position two longitudinal members relative to each other.

In accordance with a tenth aspect of the present invention, the motorized component according to any one of the first to sixth aspects is configured so that the electric actuator is configured to control a restriction state of a restriction structure configured to restrict a travel of the human-powered vehicle.

With the motorized component according to the tenth aspect, it is possible to restrict a wheel from locking up while the restriction structure restricts the travel of the human-powered vehicle, for example.

In accordance with an eleventh aspect of the present invention, a control system of a human-powered vehicle comprises the motorized component according to any one of the second to sixth aspects and a master electric device including master wireless communicator circuitry configured to wirelessly transmit the control signal to the wireless communicator circuitry of the motorized component.

With the control system according to the eleventh aspect, it is possible to wirelessly operate the motorized component using the master electric device.

In accordance with a twelfth aspect of the present invention, the control system according to the eleventh aspect is configured so that the master electric device includes a user interface configured to receive a user input. The master wireless communicator circuitry is configured to wirelessly transmit the control signal based on the user input received by the user interface.

With the control system according to the twelfth aspect, it is possible to wirelessly operate the motorized component based on the user input received by the master electric device.

In accordance with a thirteenth aspect of the present invention, the control system according to the twelfth aspect is configured so that the user interface includes a switch configured to be activated in response to the user input.

With the control system according to the thirteenth aspect, it is possible to receive the user input with a simplified structure.

In accordance with a fourteenth aspect of the present invention, the control system according to any one of the eleventh to thirteenth aspects is configured so that the master electric device is configured to be electrically connected to an electric power source configured to be remotely located from the remotely located power source.

With the control system according to the fourteenth aspect, it is possible to supply electricity to the master electric device using the electric power source in a case where the master electric device is not electrically connected to the remotely located power source.

In accordance with a fifteenth aspect of the present invention, the control system according to the fourteenth aspect is configured so that the master electric device includes a power-source holder configured to hold the electric power source.

With the control system according to the fifteenth aspect, it is possible to attach the electric power source to the master electric device via the power-source holder.

BRIEF DESCRIPTION OF DRAWINGS

A more complete appreciation of the invention and many of the attendant advantages thereof will be readily obtained as the same becomes better understood by reference to the following detailed description when considered in connection with the accompanying drawings.

DESCRIPTION OF THE EMBODIMENTS

Figure 1:
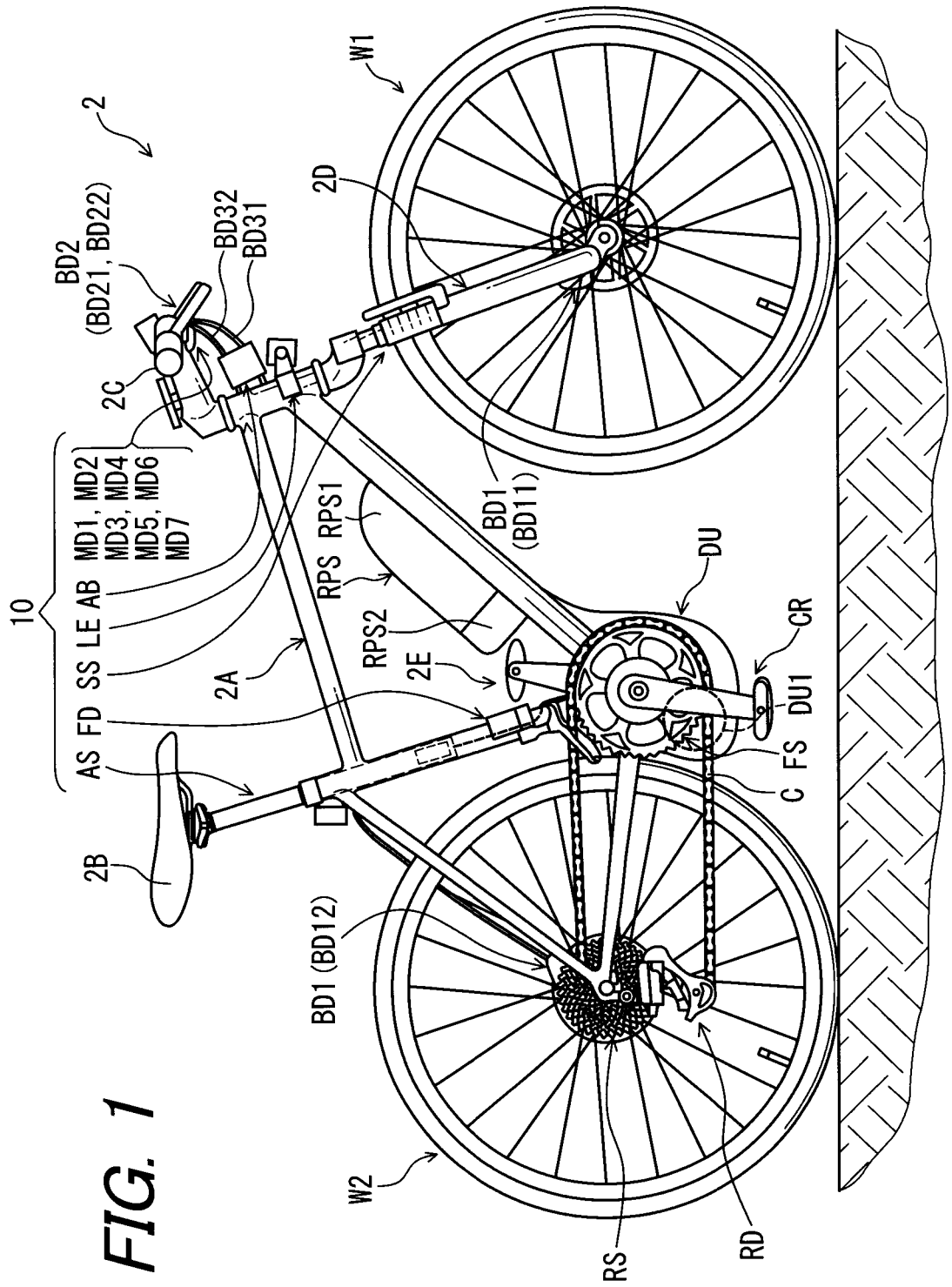
FIG. 1 is a side elevational view of a human-powered vehicle including a control system in accordance with a first embodiment.

The embodiment(s) will now be described with reference to the accompanying drawings, wherein like reference numerals designate corresponding or identical elements throughout the various drawings.

First Embodiment

As seen in FIG. 1, a human-powered vehicle 2 includes a frame 2A, a saddle 2B, a handlebar 2C, a front fork 2D, a drive train 2E, a front wheel W1, a rear wheel W2, a restriction structure BD1, a restriction operating device BD2. The restriction structure BD1 includes a brake unit BD11 and a brake unit BD12. The restriction operating device BD2 includes a brake operating device BD21, and a brake operating device BD22. The front fork 2D is rotatably mounted to the frame 2A. The handlebar 2C is secured to the front fork 2D. The front wheel W1 is rotatably coupled to the front fork 2D. The rear wheel W2 is rotatably coupled to the frame 2A.

The restriction structure BD1 is configured to restrict a travel of the human-powered vehicle 2. The restriction structure BD1 is configured to apply a braking force to the front wheel W1 in response to an operation of the brake operating device BD21. The restriction structure BD1 is configured to restrict a travel of the human-powered vehicle 2. The restriction structure BD1 is configured to apply a braking force to the rear wheel W2 in response to an operation of the brake operating device BD22. The brake operating device BD21 is connected to the restriction structure BD1 via a hydraulic hose BD31. The brake operating device BD22 is connected to the restriction structure BD1 via a hydraulic hose BD32. The restriction structure BD1 can also be referred to as a brake device or structure BD1.

In the present application, a human-powered vehicle is a vehicle to travel with a motive power including at least a human power of a user who rides the human-powered vehicle (i.e., rider). The human-powered vehicle includes a various kind of bicycles such as a mountain bike, a road bike, a city bike, a cargo bike, a hand bike, and a recumbent bike. Furthermore, the human-powered vehicle includes an electric bike (E-bike). The electric bike includes an electrically assisted bicycle configured to assist propulsion of a vehicle with an electric motor. However, a total number of wheels of the human-powered vehicle is not limited to two. For example, the human-powered vehicle includes a vehicle having one wheel or three or more wheels. Especially, the human-powered vehicle does not include a vehicle that uses only an internal-combustion engine as motive power. Generally, a light road vehicle, which includes a vehicle that does not require a driver's license for a public road, is assumed as the human-powered vehicle.

The human-powered vehicle 2 comprises a control system 10. The control system 10 for the human-powered vehicle 2 comprises a motorized component and a master electric device. In the first embodiment, the control system 10 comprises a motorized component AS, a motorized component SS, a motorized component AB, a motorized component FD, and a motorized component LE. The control system 10 comprises a master electric device MD1, a master electric device MD2, a master electric device MD3, a master electric device MD4, and a master electric device MD5.

The motorized component AS is configured to change a height of the saddle 2B relative to the frame 2A. The motorized component AS is configured to be mounted to the frame 2A. The motorized component AS can also be referred to as a rider-posture changing device AS or an adjustable seatpost AS.

The motorized component SS is configured to absorb and/or damp shock and/or vibration from a road surface. The motorized component SS is configured to be mounted to the front fork 2D. The motorized component SS can also be referred to as a rider-posture changing device SS or a suspension SS.

The motorized component AB is configured to control a restriction state of the restriction structure BD1 configured to restrict a travel of the human-powered vehicle 2. The motorized component AB is configured to restrict the front wheel W1 and/or the rear wheel W2 from locking up during braking. The motorized component AB can also be referred to as an anti-lock braking device AB.

The motorized component LE is configured to emit light. The motorized component LE can also be referred to as a light emitter LE.

The master electric device MD1 is configured to operate the motorized component AS. The master electric device MD2 is configured to operate the motorized component SS. The master electric device MD3 is configured to operate the motorized component AB. The master electric device MD4 is configured to operate the motorized component FD. The master electric device MD5 is configured to operate the motorized component LE. However, a total number of the motorized components is not limited to five. A total number of the master electric devices is not limited to five.

In the present application, the following directional terms "front," "rear," "forward," "rearward," "left," "right," "transverse," "upward" and "downward" as well as any other similar directional terms refer to those directions which are determined on the basis of a user (e.g., a rider) who is in the user's standard position (e.g., on the saddle 2B or a seat) in the human-powered vehicle 2 with facing the handlebar 2C or a steering. Accordingly, these terms, as utilized to describe the control system 10, the motorized component 12, or other components, should be interpreted relative to the human-powered vehicle 2 equipped with the control system 10, the motorized component 12, or other components as used in an upright riding position on a horizontal surface.

The drive train 2E includes a rear derailleur RD, the motorized component FD, a crank CR, a front sprocket assembly FS, a rear sprocket assembly RS, and a chain C. The motorized component FD can also be referred to as a gear changing device RD or a front derailleur FD. The front sprocket assembly FS is coupled to the crank CR to rotate relative to the frame 2A along with the crank CR. The rear sprocket assembly RS is rotatably mounted to the frame 2A. The chain C is engaged with the front sprocket assembly FS and the rear sprocket assembly RS. The rear derailleur RD is mounted to the frame 2A and is configured to shift the chain C relative to the rear sprocket assembly RS to change a gear position. The motorized component FD is mounted to the frame 2A and is configured to shift the chain C relative to the front sprocket assembly FS to change a gear position. However, the motorized component FD can be omitted from the drive train 2E if needed and/or desired.

The human-powered vehicle 2 includes an assist drive unit DU configured to assist pedaling. The assist drive unit DU includes an assist motor DU1. The assist motor DU1 is configured to apply an assist driving force to the drive train 2E. Thus, the assist drive unit DU can also be referred to as an assist drive structure DU.

In the present application, the motorized components AS, SS, AB, FD and LE are different components from the rear derailleur RD. Each of the motorized components AS, SS, AB, FD and LE does not include the rear derailleur RD and the assist drive unit DU. Each of the motorized components AS, SS, AB, FD and LE is other than the rear derailleur RD and the assist drive unit DU. Thus, the control system 10 includes the motorized components AS, SS, AB, FD and LE other than each of the rear derailleur RD and the assist drive unit DU.

The human-powered vehicle 2 includes a shift operating device MD6 and an assist operating device MD7. The shift operating device MD6 is configured to operate the rear derailleur RD. The assist operating device MD7 is configured to operate the assist drive unit DU.

As seen in FIG. 1, the human-powered vehicle 2 includes a remotely located power source RPS. The remotely located power source RPS is configured to supply electricity to the motorized components AS, SS, AB, FD and LE, the rear derailleur RD, and the assist drive unit DU. The remotely located power source RPS includes a battery RPS1 and a battery holder RPS2. The battery RPS1 is configured to supply electricity to the motorized components AS, SS, AB, FD and LE, the rear derailleur RD, and the assist drive unit DU via the battery holder RPS2. The battery holder RPS2 is coupled to the frame 2A. The battery holder RPS2 is configured to detachably and reattachably hold the battery RPS1. The battery RPS1 is configured to be detachably and reattachably connected to the battery holder RPS2. The remotely located power source RPS can be at least partially provided in the frame 2A if needed and/or desired.

The control system 10 includes a wired communication structure WS. The remotely located power source RPS is electrically connected to the motorized components AS, SS, AB, FD and LE, the rear derailleur RD, and the assist drive unit DU with the wired communication structure WS to supply electricity to the motorized components AS, SS, AB, FD and LE, the rear derailleur RD, and the assist drive unit DU. For example, the wired communication structure WS includes at least one electric cable.

Figure 2:
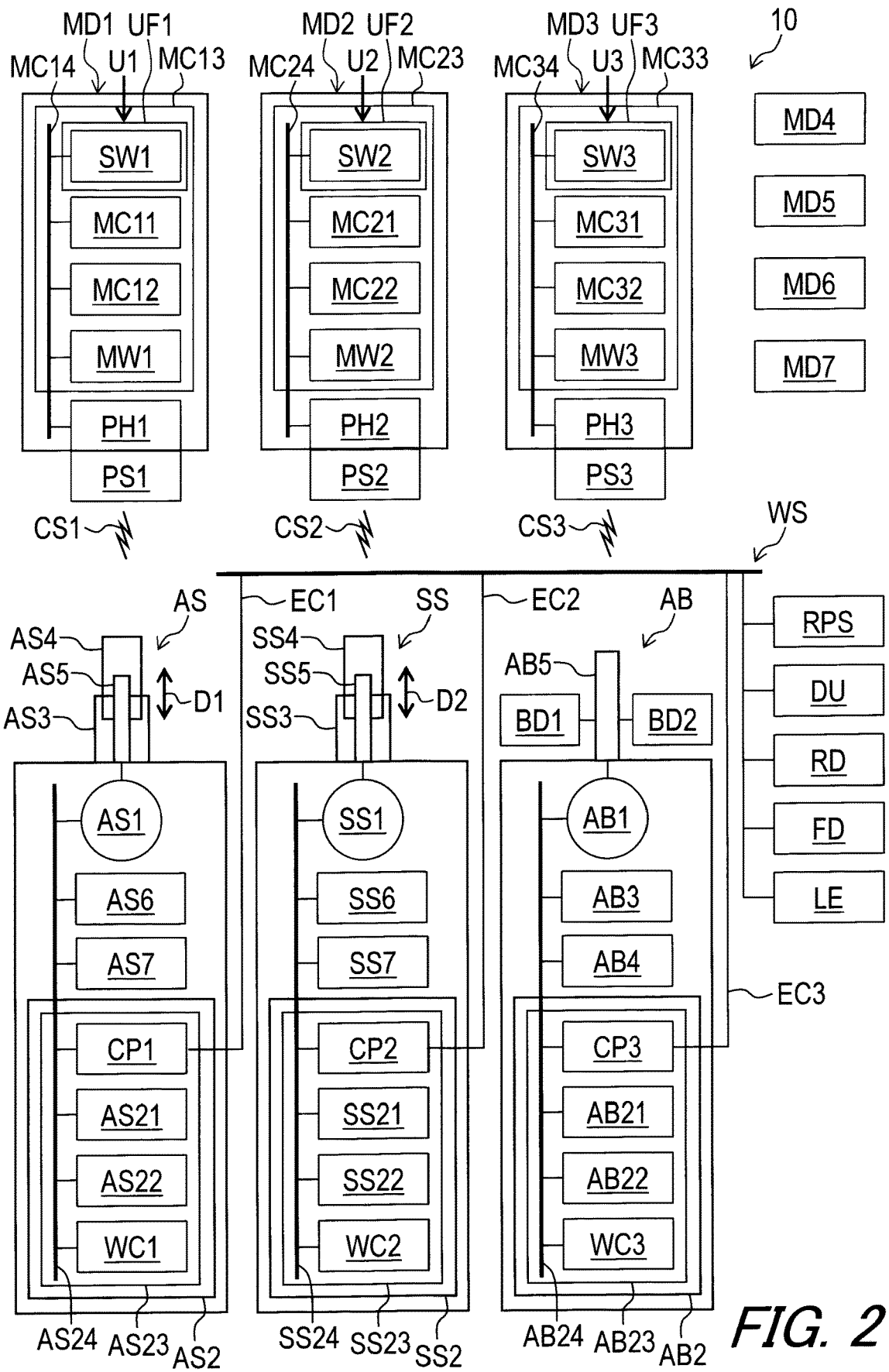
FIG. 2 is a schematic block diagram of the control system for the human-powered vehicle illustrated in FIG. 1.

As seen in FIG. 2, the motorized component AS for the human-powered vehicle 2 other than the rear derailleur RD comprises an electric actuator AS1 and a controller AS2 configured to control the electric actuator AS1. Examples of the electric actuator AS1 include a motor.

At least one of the electric actuator AS1 and the controller AS2 is configured to be electrically connected via an electric cable EC1 to the remotely located power source RPS configured to supply electricity to the assist drive unit DU configured to assist pedaling. In the first embodiment, each of the electric actuator AS1 and the controller AS2 is configured to be electrically connected to the remotely located power source RPS via the electric cable EC1. However, only one of the electric actuator AS1 and the controller AS2 can be configured to be electrically connected via the electric cable EC1 to the remotely located power source RPS if needed and/or desired.

The motorized component AS further comprises a wireless communicator WC1 electrically connected to the controller AS2. The wireless communicator WC1 is configured to wirelessly communicate with another wireless communicator of another component via a wireless communication channel. The controller AS2 is configured to receive a control signal from another component via the wireless communicator WC1. The controller AS2 is configured to receive a control signal CS1 from the master electric device MD1 via the wireless communicator WC1.

At least one of the electric actuator AS1, the wireless communicator WC1, and the controller AS2 is configured to receive electricity from the remotely located power source RPS via the electric cable EC1. In the first embodiment, each of the electric actuator AS1, the wireless communicator WC1, and the controller AS2 is configured to receive electricity from the remotely located power source RPS via the electric cable EC1. However, only one or two of the electric actuator AS1, the wireless communicator WC1, and the controller AS2 can be configured to be electrically connected via the electric cable EC1 to the remotely located power source RPS if needed and/or desired.

The controller AS2 includes a processor AS21, a memory AS22, a circuit board AS23, and a system bus AS24. The processor AS21 and the memory AS22 are electrically mounted on the circuit board AS23. The processor AS21 includes a central processing unit (CPU) and a memory controller. The memory AS22 is electrically connected to the processor AS21. The memory AS22 includes a read only memory (ROM) and a random-access memory (RAM). The memory AS22 includes storage areas each having an address in the ROM and the RAM. The processor AS21 is configured to control the memory AS22 to store data in the storage areas of the memory AS22 and reads data from the storage areas of the memory AS22. The memory AS22 (e.g., the ROM) stores a program. The program is read into the processor AS21, and thereby the configuration and/or algorithm of the controller AS2 is performed. The controller AS2 can also be referred to as a controller circuit or circuitry AS2.

The wireless communicator WC1 is electrically mounted on the circuit board AS23. The wireless communicator WC1 is electrically connected to the processor AS21 and the memory AS22 with the circuit board AS23 and the system bus AS24. The wireless communicator WC1 includes a signal transmitting circuit, a signal receiving circuit, and an antenna. Thus, the wireless communicator WC1 can also be referred to as a wireless communicator circuit or circuitry WC1.

The wireless communicator WC1 is configured to superimpose digital signals on carrier wave using a predetermined wireless communication protocol to wirelessly transmit a control signal. In the first embodiment, the wireless communicator WC1 is configured to encrypt a control signal using a cryptographic key to generate encrypted wireless signals.

The wireless communicator WC1 is configured to receives a wireless signal via the antenna. In the first embodiment, the wireless communicator WC1 is configured to decode the wireless signal to recognize the control signal CS1 wirelessly transmitted from the master electric device MD1. The wireless communicator WC1 is configured to decrypt the control signal CS1 using the cryptographic key.

As seen in FIG. 2, the master electric device MD1 includes a master controller MC1. The master electric device MD1 includes a master wireless communicator MW1. The master controller MC1 is electrically connected to the master wireless communicator MW1. The master wireless communicator MW1 is configured to wirelessly transmit the control signal CS1 to the wireless communicator WC1 of the motorized component AS. The controller AS2 is configured to receive the control signal CS1 from the master electric device MD1 via the wireless communicator WC1. The controller AS2 is configured to control the electric actuator AS1 based on the control signal CS1 wirelessly transmitted from the master wireless communicator MW1 of the master electric device MD1.

The master electric device MD1 includes a user interface UF1 configured to receive a user input U1. The master wireless communicator MW1 is configured to wirelessly transmit the control signal CS1 based on the user input U1 received by the user interface UF1. The user interface UF1 is electrically connected to the master controller MC1. The master controller MC1 is configured to control the master wireless communicator MW1 to wirelessly transmit the control signal CS1 in response to the user input U1. In the first embodiment, the user interface UF1 includes a switch SW1 configured to be activated in response to the user input U1. The switch SW1 is electrically connected to the master controller MC1. However, the user interface UF1 can include other structures instead of or in addition to the switch SW1.

The master controller MC1 includes a processor MC11, a memory MC12, a circuit board MC13, and a system bus MC14. The processor MC11 and the memory MC12 are electrically mounted on the circuit board MC13. The processor MC11 includes a CPU and a memory controller. The memory MC12 is electrically connected to the processor MC11. The memory MC12 includes a ROM and a RAM. The memory MC12 includes storage areas each having an address in the ROM and the RAM. The processor MC11 is configured to control the memory MC12 to store data in the storage areas of the memory MC12 and reads data from the storage areas of the memory MC12. The circuit board MC13 and the user interface UF1 are electrically connected to the system bus MC14. The circuit board MC13 and the switch SW1 are electrically connected to the system bus MC14. The use interface is electrically connected to the processor MC11 and the memory MC12 with the circuit board MC13 and the system bus MC14. The switch SW1 is electrically connected to the processor MC11 and the memory MC12 with the circuit board MC13 and the system bus MC14. The memory MC12 (e.g., the ROM) stores a program. The program is read into the processor MC11, and thereby the configuration and/or algorithm of the master electric device MD1 is performed. The master controller MC1 can also be referred to as a master controller circuit or circuitry MC1.

The master wireless communicator MW1 is electrically mounted on the circuit board MC13. The master wireless communicator MW1 is electrically connected to the processor MC11 and the memory MC12 with the circuit board MC13 and the system bus MC14. The master wireless communicator MW1 includes a signal transmitting circuit, a signal receiving circuit, and an antenna. Thus, the master wireless communicator MW1 can also be referred to as a master wireless communicator circuit or circuitry MW1.

The master wireless communicator MW1 is configured to superimpose digital signals such as the control signal CS1 on carrier wave using a predetermined wireless communication protocol to wirelessly transmit the control signal CS1. In the first embodiment, the master wireless communicator MW1 is configured to encrypt a control signal CS1 using a cryptographic key to generate encrypted wireless signals.

The master wireless communicator MW1 is configured to receives a wireless signal via the antenna. In the first embodiment, the master wireless communicator MW1 is configured to decode the wireless signal to recognize signals and/or information wirelessly transmitted from another wireless communicator. The master wireless communicator MW1 is configured to decrypt the wireless signal using the cryptographic key.

The control system 10 includes an electric power source PS1. The electric power source PS1 is configured to supply electricity to the master electric device MD1. The electric power source PS1 is configured to supply electricity to the master controller MC1 and the master wireless communicator MW1. The master electric device MD1 is configured to be electrically connected to the electric power source PS1 configured to be remotely located from the remotely located power source RPS. The master electric device MD1 includes a power-source holder PH1 configured to hold the electric power source PS1. The power-source holder PH1 is configured to be detachably and reattachably hold the electric power source PS1. The electric power source PS1 is configured to be detachably and reattachably connected to the power source holder. Examples of the electric power source PS1 include a battery (e.g., a primary battery or a secondary battery). The electric power source PS1 can include another component such as a capacitor and an electricity generation element (e.g., a piezoelectric element) instead of or in addition to the battery.

The motorized component AS further comprises a connection port CP1 to which the electric cable EC1 is configured to be detachably and reattachably connected such that the connection port CP1 is electrically connected to the at least one of the electric actuator AS1 and the controller AS2. The motorized component AS further comprises the connection port CP1 to which the electric cable EC1 is configured to be detachably and reattachably connected such that the connection port CP1 is electrically connected to the at least one of the electric actuator AS1, the wireless communicator WC1, and the controller AS2. In the first embodiment, the connection port CP1 is configured to be electrically connected to the electric actuator AS1, the wireless communicator WC1, and the controller AS2. However, the connection port CP1 can be configured to be electrically connected to only one or two of the electric actuator AS1, the wireless communicator WC1, and the controller AS2 if needed and/or desired.

As seen in FIG. 2, the motorized component AS further comprises a first member AS3 and a second member AS4 configured to be movable relative to the first member AS3. The motorized component AS further comprises a positioning structure AS5 configured to adjustably position the first member AS3 and the second member AS4 relative to each other. The positioning structure AS5 is configured to position the first member AS3 and the second member AS4 relative to each other in a lock state. The positioning structure AS5 is configured to allow the first member AS3 and the second member AS4 to move relative to each other in an adjustable state. The electric actuator AS1 is configured to actuate the positioning structure AS5 to change a state of the positioning structure AS5 between the lock state and the adjustable state. The controller AS2 is configured to control the electric actuator AS1 to actuate the positioning structure AS5.

The first member AS3 extends in a longitudinal direction D1. The second member AS4 extends in the longitudinal direction D1. The first member AS3 and the second member AS4 is configured to be movable relative to each other in the longitudinal direction D1. The positioning structure AS5 is configured to position the first member AS3 and the second member AS4 relative to each other in the longitudinal direction D1 in the lock state and configured to allow the first member AS3 and the second member AS4 to move relative to each other in the longitudinal direction D1 in the adjustable state.

In the first embodiment, the positioning structure AS5 includes a hydraulic valve configured to change the state of the positioning structure AS5 between the lock state and the adjustable state. The electric actuator AS1 is configured to move the hydraulic valve between a closed position and an open position. The positioning structure AS5 is in the lock state in a state where the hydraulic valve is in the closed position. The positioning structure AS5 is in the adjustable state in a state where the hydraulic valve is in the open position. However, the positioning structure AS5 can include other structures such as a ball screw.

The motorized component AS includes a position sensor AS6 and a motor driver AS7. The electric actuator AS1 is electrically connected to the position sensor AS6 and the motor driver AS7. The electric actuator AS1 includes a rotational shaft operatively coupled to the positioning structure AS5. The position sensor AS6 is configured to sense a current position of the hydraulic valve of the positioning structure AS5. Examples of the position sensor AS6 include a potentiometer and a rotary encoder. The position sensor AS6 is configured to sense an absolute rotational position of an output shaft of the electric actuator AS1 as the current position of the hydraulic valve of the positioning structure AS5. The motor driver AS7 is configured to control the electric actuator AS1 based on the current position of the hydraulic valve of the positioning structure AS5 sensed by the position sensor AS6.

As seen in FIG. 2, the motorized component SS for the human-powered vehicle 2 other than the rear derailleur RD comprises an electric actuator SS1 and a controller SS2 configured to control the electric actuator SS1. Examples of the electric actuator SS1 include a motor.

At least one of the electric actuator SS1 and the controller SS2 is configured to be electrically connected via an electric cable EC2 to the remotely located power source RPS configured to supply electricity to the assist drive unit DU configured to assist pedaling. In the first embodiment, each of the electric actuator SS1 and the controller SS2 is configured to be electrically connected to the remotely located power source RPS via the electric cable EC2. However, only one of the electric actuator SS1 and the controller SS2 can be configured to be electrically connected via the electric cable EC2 to the remotely located power source RPS if needed and/or desired.

The motorized component SS further comprises a wireless communicator WC2 electrically connected to the controller SS2. The wireless communicator WC2 is configured to wirelessly communicate with another wireless communicator of another component via a wireless communication channel. The controller SS2 is configured to receive a control signal from another component via the wireless communicator WC2. The controller SS2 is configured to receive a control signal CS2 from the master electric device MD2 via the wireless communicator WC2.

At least one of the electric actuator SS1, the wireless communicator WC2, and the controller SS2 is configured to receive electricity from the remotely located power source RPS via the electric cable EC2. In the first embodiment, each of the electric actuator SS1, the wireless communicator WC2, and the controller SS2 is configured to receive electricity from the remotely located power source RPS via the electric cable EC2. However, only one or two of the electric actuator SS1, the wireless communicator WC2, and the controller SS2 can be configured to be electrically connected via the electric cable EC2 to the remotely located power source RPS if needed and/or desired.

The controller SS2 includes a processor SS21, a memory SS22, a circuit board SS23, and a system bus SS24. The processor SS21 and the memory SS22 are electrically mounted on the circuit board SS23. The processor SS21 includes a CPU and a memory controller. The memory SS22 is electrically connected to the processor SS21. The memory SS22 includes a ROM and a RAM. The memory SS22 includes storage areas each having an address in the ROM and the RAM. The processor SS21 is configured to control the memory SS22 to store data in the storage areas of the memory SS22 and reads data from the storage areas of the memory SS22. The memory SS22 (e.g., the ROM) stores a program. The program is read into the processor SS21, and thereby the configuration and/or algorithm of the controller SS2 is performed. The controller SS2 can also be referred to as a controller circuit or circuitry SS2.

The wireless communicator WC2 is electrically mounted on the circuit board SS23. The wireless communicator WC2 is electrically connected to the processor SS21 and the memory SS22 with the circuit board SS23 and the system bus SS24. The wireless communicator WC2 includes a signal transmitting circuit, a signal receiving circuit, and an antenna. Thus, the wireless communicator WC2 can also be referred to as a wireless communicator circuit or circuitry WC2.

The wireless communicator WC2 is configured to superimpose digital signals on carrier wave using a predetermined wireless communication protocol to wirelessly transmit a control signal. In the first embodiment, the wireless communicator WC2 is configured to encrypt a control signal using a cryptographic key to generate encrypted wireless signals.

The wireless communicator WC2 is configured to receives a wireless signal via the antenna. In the first embodiment, the wireless communicator WC2 is configured to decode the wireless signal to recognize the control signal CS2 wirelessly transmitted from the master electric device MD2. The wireless communicator WC2 is configured to decrypt the control signal CS2 using the cryptographic key.

As seen in FIG. 2, the master electric device MD2 includes a master controller MC2. The master electric device MD2 includes a master wireless communicator MW2. The master controller MC2 is electrically connected to the master wireless communicator MW2. The master wireless communicator MW2 is configured to wirelessly transmit the control signal CS2 to the wireless communicator WC2 of the motorized component SS. The controller SS2 is configured to receive the control signal CS2 from the master electric device MD2 via the wireless communicator WC2. The controller SS2 is configured to control the electric actuator SS1 based on the control signal CS2 wirelessly transmitted from the master wireless communicator MW2 of the master electric device MD2.

The master electric device MD2 includes a user interface UF2 configured to receive a user input U2. The master wireless communicator MW2 is configured to wirelessly transmit the control signal CS2 based on the user input U2 received by the user interface UF2. The user interface UF2 is electrically connected to the master controller MC2. The master controller MC2 is configured to control the master wireless communicator MW2 to wirelessly transmit the control signal CS2 in response to the user input U2. In the first embodiment, the user interface UF2 includes a switch SW2 configured to be activated in response to the user input U2. The switch SW2 is electrically connected to the master controller MC2. However, the user interface UF2 can include other structures instead of or in addition to the switch SW2.

The master controller MC2 includes a processor MC21, a memory MC22, a circuit board MC23, and a system bus MC24. The processor MC21 and the memory MC22 are electrically mounted on the circuit board MC23. The processor MC21 includes a CPU and a memory controller. The memory MC22 is electrically connected to the processor MC21. The memory MC22 includes a ROM and a RAM. The memory MC22 includes storage areas each having an address in the ROM and the RAM. The processor MC21 is configured to control the memory MC22 to store data in the storage areas of the memory MC22 and reads data from the storage areas of the memory MC22. The circuit board MC23 and the user interface UF2 are electrically connected to the system bus MC24. The circuit board MC23 and the switch SW2 are electrically connected to the system bus MC24. The use interface is electrically connected to the processor MC21 and the memory MC22 with the circuit board MC23 and the system bus MC24. The switch SW2 is electrically connected to the processor MC21 and the memory MC22 with the circuit board MC23 and the system bus MC24. The memory MC22 (e.g., the ROM) stores a program. The program is read into the processor MC21, and thereby the configuration and/or algorithm of the master electric device MD2 is performed. The master controller MC2 can also be referred to as a master controller circuit or circuitry MC2.

The master wireless communicator MW2 is electrically mounted on the circuit board MC23. The master wireless communicator MW2 is electrically connected to the processor MC21 and the memory MC22 with the circuit board MC23 and the system bus MC24. The master wireless communicator MW2 includes a signal transmitting circuit, a signal receiving circuit, and an antenna. Thus, the master wireless communicator MW2 can also be referred to as a master wireless communicator circuit or circuitry MW2.

The master wireless communicator MW2 is configured to superimpose digital signals such as the control signal CS2 on carrier wave using a predetermined wireless communication protocol to wirelessly transmit the control signal CS2. In the first embodiment, the master wireless communicator MW2 is configured to encrypt a control signal CS2 using a cryptographic key to generate encrypted wireless signals.

The master wireless communicator MW2 is configured to receives a wireless signal via the antenna. In the first embodiment, the master wireless communicator MW2 is configured to decode the wireless signal to recognize signals and/or information wirelessly transmitted from another wireless communicator. The master wireless communicator MW2 is configured to decrypt the wireless signal using the cryptographic key.

The control system 10 includes an electric power source PS2. The electric power source PS2 is configured to supply electricity to the master electric device MD2. The electric power source PS2 is configured to supply electricity to the master controller MC2 and the master wireless communicator MW2. The master electric device MD2 is configured to be electrically connected to the electric power source PS2 configured to be remotely located from the remotely located power source RPS. The master electric device MD2 includes a power-source holder PH2 configured to hold the electric power source PS2. The power-source holder PH2 is configured to be detachably and reattachably hold the electric power source PS2. The electric power source PS2 is configured to be detachably and reattachably connected to the power source holder. Examples of the electric power source PS2 include a battery (e.g., a primary battery or a secondary battery). The electric power source PS2 can include another component such as a capacitor and an electricity generation element (e.g., a piezoelectric element) instead of or in addition to the battery.

The motorized component SS further comprises a connection port CP2 to which the electric cable EC2 is configured to be detachably and reattachably connected such that the connection port CP2 is electrically connected to the at least one of the electric actuator SS1 and the controller SS2. The motorized component SS further comprises the connection port CP2 to which the electric cable EC2 is configured to be detachably and reattachably connected such that the connection port CP2 is electrically connected to the at least one of the electric actuator SS1, the wireless communicator WC2, and the controller SS2. In the first embodiment, the connection port CP2 is configured to be electrically connected to the electric actuator SS1, the wireless communicator WC2, and the controller SS2. However, the connection port CP2 can be configured to be electrically connected to only one or two of the electric actuator SS1, the wireless communicator WC2, and the controller SS2 if needed and/or desired.

As seen in FIG. 2, the motorized component SS further comprises a first member SS3 and a second member SS4 configured to be movable relative to the first member SS3. The motorized component SS further comprises a positioning structure SS5 configured to adjustably position the first member SS3 and the second member SS4 relative to each other. The positioning structure SS5 is configured to position the first member SS3 and the second member SS4 relative to each other in a lock state. The positioning structure SS5 is configured to allow the first member SS3 and the second member SS4 to move relative to each other in an adjustable state. The electric actuator SS1 is configured to actuate the positioning structure SS5 to change a state of the positioning structure SS5 between the lock state and the adjustable state. The controller SS2 is configured to control the electric actuator SS1 to actuate the positioning structure SS5.

The first member SS3 extends in a longitudinal direction D2. The second member SS4 extends in the longitudinal direction D2. The first member SS3 and the second member SS4 is configured to be movable relative to each other in the longitudinal direction D2. The positioning structure SS5 is configured to position the first member SS3 and the second member SS4 relative to each other in the longitudinal direction D2 in the lock state and configured to allow the first member SS3 and the second member SS4 to move relative to each other in the longitudinal direction D2 in the adjustable state.

In the first embodiment, the positioning structure SS5 includes a hydraulic valve configured to change the state of the positioning structure SS5 between the lock state and the adjustable state. The electric actuator SS1 is configured to move the hydraulic valve between a closed position and an open position. The positioning structure SS5 is in the lock state in a state where the hydraulic valve is in the closed position. The positioning structure SS5 is in the adjustable state in a state where the hydraulic valve is in the open position. However, the positioning structure SS5 can include other structures such as a ball screw.

The motorized component SS includes a position sensor SS6 and a motor driver SS7. The electric actuator SS1 is electrically connected to the position sensor SS6 and the motor driver SS7. The electric actuator SS1 includes a rotational shaft operatively coupled to the positioning structure SS5. The position sensor SS6 is configured to sense a current position of the hydraulic valve of the positioning structure SS5. Examples of the position sensor SS6 include a potentiometer and a rotary encoder. The position sensor SS6 is configured to sense an absolute rotational position of an output shaft of the electric actuator SS1 as the current position of the hydraulic valve of the positioning structure SS5. The motor driver SS7 is configured to control the electric actuator SS1 based on the current position of the hydraulic valve of the positioning structure SS5 sensed by the position sensor SS6.

The motorized component SS is configured to absorb and/or damp shock and/or vibration from a road surface in the adjustable state. However, the positioning structure SS5 can be configured to change an original relative position and/or a stroke between the first member SS3 and the second member SS4 in the longitudinal direction D2. The positioning structure SS5 can be configured to change an absorbing and/or damping performance.

As seen in FIG. 2, the motorized component AB for the human-powered vehicle 2 other than the rear derailleur RD comprises an electric actuator AB1 and a controller AB2 configured to control the electric actuator AB1. Examples of the electric actuator AB1 include a motor.

At least one of the electric actuator AB1 and the controller AB2 is configured to be electrically connected via an electric cable EC3 to the remotely located power source RPS configured to supply electricity to the assist drive unit DU configured to assist pedaling. In the first embodiment, each of the electric actuator AB1 and the controller AB2 is configured to be electrically connected to the remotely located power source RPS via the electric cable EC3. However, only one of the electric actuator AB1 and the controller AB2 can be configured to be electrically connected via the electric cable EC3 to the remotely located power source RPS if needed and/or desired.

The motorized component AB further comprises a wireless communicator WC3 electrically connected to the controller AB2. The wireless communicator WC3 is configured to wirelessly communicate with another wireless communicator of another component via a wireless communication channel. The controller AB2 is configured to receive a control signal from another component via the wireless communicator WC3. The controller AB2 is configured to receive a control signal CS3 from the master electric device MD3 via the wireless communicator WC3.

At least one of the electric actuator AB1, the wireless communicator WC3, and the controller AB2 is configured to receive electricity from the remotely located power source RPS via the electric cable EC3. In the first embodiment, each of the electric actuator AB1, the wireless communicator WC3, and the controller AB2 is configured to receive electricity from the remotely located power source RPS via the electric cable EC3. However, only one or two of the electric actuator AB1, the wireless communicator WC3, and the controller AB2 can be configured to be electrically connected via the electric cable EC3 to the remotely located power source RPS if needed and/or desired.

The controller AB2 includes a processor AB21, a memory AB22, a circuit board AB23, and a system bus AB24. The processor AB21 and the memory AB22 are electrically mounted on the circuit board AB23. The processor AB21 includes a CPU and a memory controller. The memory AB22 is electrically connected to the processor AB21. The memory AB22 includes a ROM and a RAM. The memory AB22 includes storage areas each having an address in the ROM and the RAM. The processor AB21 is configured to control the memory AB22 to store data in the storage areas of the memory AB22 and reads data from the storage areas of the memory AB22. The memory AB22 (e.g., the ROM) stores a program. The program is read into the processor AB21, and thereby the configuration and/or algorithm of the controller AB2 is performed. The controller AB2 can also be referred to as a controller circuit or circuitry AB2.

The wireless communicator WC3 is electrically mounted on the circuit board AB23. The wireless communicator WC3 is electrically connected to the processor AB21 and the memory AB22 with the circuit board AB23 and the system bus AB24. The wireless communicator WC3 includes a signal transmitting circuit, a signal receiving circuit, and an antenna. Thus, the wireless communicator WC3 can also be referred to as a wireless communicator circuit or circuitry WC3.

The wireless communicator WC3 is configured to superimpose digital signals on carrier wave using a predetermined wireless communication protocol to wirelessly transmit a control signal. In the first embodiment, the wireless communicator WC3 is configured to encrypt a control signal using a cryptographic key to generate encrypted wireless signals.

The wireless communicator WC3 is configured to receives a wireless signal via the antenna. In the first embodiment, the wireless communicator WC3 is configured to decode the wireless signal to recognize the control signal CS3 wirelessly transmitted from the master electric device MD3. The wireless communicator WC3 is configured to decrypt the control signal CS3 using the cryptographic key.

As seen in FIG. 2, the master electric device MD3 includes a master controller MC3. The master electric device MD3 includes a master wireless communicator MW3. The master controller MC3 is electrically connected to the master wireless communicator MW3. The master wireless communicator MW3 is configured to wirelessly transmit the control signal CS3 to the wireless communicator WC3 of the motorized component AB. The controller AB2 is configured to receive the control signal CS3 from the master electric device MD3 via the wireless communicator WC3. The controller AB2 is configured to control the electric actuator AB1 based on the control signal CS3 wirelessly transmitted from the master wireless communicator MW3 of the master electric device MD3.

The master electric device MD3 includes a user interface UF3 configured to receive a user input U3. The master wireless communicator MW3 is configured to wirelessly transmit the control signal CS3 based on the user input U3 received by the user interface UF3. The user interface UF3 is electrically connected to the master controller MC3. The master controller MC3 is configured to control the master wireless communicator MW3 to wirelessly transmit the control signal CS3 in response to the user input U3. In the first embodiment, the user interface UF3 includes a switch SW3 configured to be activated in response to the user input U3. The switch SW3 is electrically connected to the master controller MC3. However, the user interface UF3 can include other structures instead of or in addition to the switch SW3.

The master controller MC3 includes a processor MC31, a memory MC32, a circuit board MC33, and a system bus MC34. The processor MC31 and the memory MC32 are electrically mounted on the circuit board MC33. The processor MC31 includes a CPU and a memory controller. The memory MC32 is electrically connected to the processor MC31. The memory MC32 includes a ROM and a RAM. The memory MC32 includes storage areas each having an address in the ROM and the RAM. The processor MC31 is configured to control the memory MC32 to store data in the storage areas of the memory MC32 and reads data from the storage areas of the memory MC32. The circuit board MC33 and the user interface UF3 are electrically connected to the system bus MC34. The circuit board MC33 and the switch SW3 are electrically connected to the system bus MC34. The use interface is electrically connected to the processor MC31 and the memory MC32 with the circuit board MC33 and the system bus MC34. The switch SW3 is electrically connected to the processor MC31 and the memory MC32 with the circuit board MC33 and the system bus MC34. The memory MC32 (e.g., the ROM) stores a program. The program is read into the processor MC31, and thereby the configuration and/or algorithm of the master electric device MD3 is performed. The master controller MC3 can also be referred to as a master controller circuit or circuitry MC3.

The master wireless communicator MW3 is electrically mounted on the circuit board MC33. The master wireless communicator MW3 is electrically connected to the processor MC31 and the memory MC32 with the circuit board MC33 and the system bus MC34. The master wireless communicator MW3 includes a signal transmitting circuit, a signal receiving circuit, and an antenna. Thus, the master wireless communicator MW3 can also be referred to as a master wireless communicator circuit or circuitry MW3.

The master wireless communicator MW3 is configured to superimpose digital signals such as the control signal CS3 on carrier wave using a predetermined wireless communication protocol to wirelessly transmit the control signal CS3. In the first embodiment, the master wireless communicator MW3 is configured to encrypt a control signal CS3 using a cryptographic key to generate encrypted wireless signals.

The master wireless communicator MW3 is configured to receives a wireless signal via the antenna. In the first embodiment, the master wireless communicator MW3 is configured to decode the wireless signal to recognize signals and/or information wirelessly transmitted from another wireless communicator. The master wireless communicator MW3 is configured to decrypt the wireless signal using the cryptographic key.

The control system 10 includes an electric power source PS3. The electric power source PS3 is configured to supply electricity to the master electric device MD1 The electric power source PS3 is configured to supply electricity to the master controller MC3 and the master wireless communicator MW3. The master electric device MD3 is configured to be electrically connected to the electric power source PS3 configured to be remotely located from the remotely located power source RPS. The master electric device MD3 includes a power-source holder PH3 configured to hold the electric power source PS3. The power-source holder PH3 is configured to be detachably and reattachably hold the electric power source PS3. The electric power source PS3 is configured to be detachably and reattachably connected to the power source holder. Examples of the electric power source PS3 include a battery (e.g., a primary battery or a secondary battery). The electric power source PS3 can include another component such as a capacitor and an electricity generation element (e.g., a piezoelectric element) instead of or in addition to the battery.

The motorized component AB further comprises a connection port CP3 to which the electric cable EC3 is configured to be detachably and reattachably connected such that the connection port CP3 is electrically connected to the at least one of the electric actuator AB1 and the controller AB2. The motorized component AB further comprises the connection port CP3 to which the electric cable EC3 is configured to be detachably and reattachably connected such that the connection port CP3 is electrically connected to the at least one of the electric actuator AB1, the wireless communicator WC3, and the controller AB2. In the first embodiment, the connection port CP3 is configured to be electrically connected to the electric actuator AB1, the wireless communicator WC3, and the controller AB2. However, the connection port CP3 can be configured to be electrically connected to only one or two of the electric actuator AB1, the wireless communicator WC3, and the controller AB2 if needed and/or desired.

As seen in FIG. 2, the electric actuator AB1 is configured to control a restriction state of the restriction structure BD1 configured to restrict a travel of the human-powered vehicle 2. The motorized component AB includes a hydraulic device AB3, a rotation sensor AB4, and a rotation sensor AB5. The hydraulic device AB3 is configured to control a hydraulic pressure supplied from the restriction operating device BD2 to the restriction structure BD1. The hydraulic device AB3 is configured to control a hydraulic pressure supplied from the brake operating device BD21 to the brake unit BD11 (see e.g., FIG. 1). The hydraulic device AB3 is configured to control a hydraulic pressure supplied from the brake operating device BD22 to the brake unit BD12 (see e.g., FIG. 1). For example, the controller AB2 is configured to control the electric actuator AB1 to change the restriction state of the restriction structure BD1 via the hydraulic device AB3 if the rotational speed of the front wheel W1 is lower than the rotational speed of the rear wheel W2.

Figure 3:
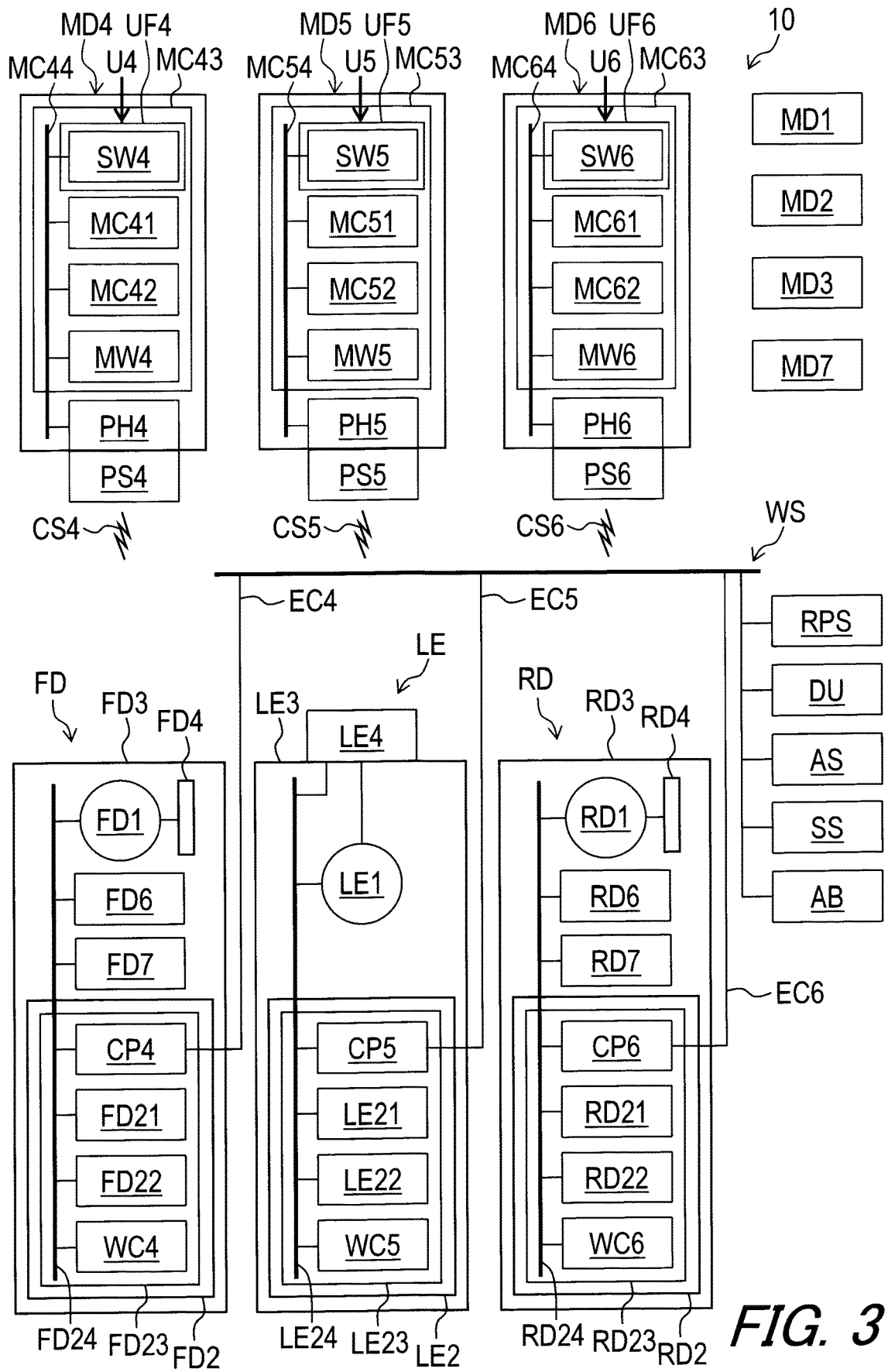
FIG. 3 is a schematic block diagram of the control system for the human-powered vehicle illustrated in FIG. 1.

As seen in FIG. 3, the motorized component FD for the human-powered vehicle 2 other than the rear derailleur RD comprises an electric actuator FD1 and a controller FD2 configured to control the electric actuator FD1. Examples of the electric actuator FD1 include a motor.

At least one of the electric actuator FD1 and the controller FD2 is configured to be electrically connected via an electric cable EC4 to the remotely located power source RPS configured to supply electricity to the assist drive unit DU configured to assist pedaling. In the first embodiment, each of the electric actuator FD1 and the controller FD2 is configured to be electrically connected to the remotely located power source RPS via the electric cable EC4. However, only one of the electric actuator FD1 and the controller FD2 can be configured to be electrically connected via the electric cable EC4 to the remotely located power source RPS if needed and/or desired.

The motorized component FD further comprises a wireless communicator WC4 electrically connected to the controller FD2. The wireless communicator WC4 is configured to wirelessly communicate with another wireless communicator of another component via a wireless communication channel. The controller FD2 is configured to receive a control signal from another component via the wireless communicator WC4. The controller FD2 is configured to receive a control signal CS4 from the master electric device MD4 via the wireless communicator WC4.

At least one of the electric actuator FD1, the wireless communicator WC4, and the controller FD2 is configured to receive electricity from the remotely located power source RPS via the electric cable EC4. In the first embodiment, each of the electric actuator FD1, the wireless communicator WC4, and the controller FD2 is configured to receive electricity from the remotely located power source RPS via the electric cable EC4. However, only one or two of the electric actuator FD1, the wireless communicator WC4, and the controller FD2 can be configured to be electrically connected via the electric cable EC4 to the remotely located power source RPS if needed and/or desired.

The controller FD2 includes a processor FD21, a memory FD22, a circuit board FD23, and a system bus FD24. The processor FD21 and the memory FD22 are electrically mounted on the circuit board FD23. The processor FD21 includes a CPU and a memory controller. The memory FD22 is electrically connected to the processor FD21. The memory FD22 includes a ROM and a RAM. The memory FD22 includes storage areas each having an address in the ROM and the RAM. The processor FD21 is configured to control the memory FD22 to store data in the storage areas of the memory FD22 and reads data from the storage areas of the memory FD22. The memory FD22 (e.g., the ROM) stores a program. The program is read into the processor FD21, and thereby the configuration and/or algorithm of the controller FD2 is performed. The controller FD2 can also be referred to as a controller circuit or circuitry FD2.

The wireless communicator WC4 is electrically mounted on the circuit board FD23. The wireless communicator WC4 is electrically connected to the processor FD21 and the memory FD22 with the circuit board FD23 and the system bus FD24. The wireless communicator WC4 includes a signal transmitting circuit, a signal receiving circuit, and an antenna. Thus, the wireless communicator WC4 can also be referred to as a wireless communicator circuit or circuitry WC4.

The wireless communicator WC4 is configured to superimpose digital signals on carrier wave using a predetermined wireless communication protocol to wirelessly transmit a control signal. In the first embodiment, the wireless communicator WC4 is configured to encrypt a control signal using a cryptographic key to generate encrypted wireless signals.

The wireless communicator WC4 is configured to receives a wireless signal via the antenna. In the first embodiment, the wireless communicator WC4 is configured to decode the wireless signal to recognize the control signal CS4 wirelessly transmitted from the master electric device MD4. The wireless communicator WC4 is configured to decrypt the control signal CS4 using the cryptographic key.

As seen in FIG. 3, the master electric device MD4 includes a master controller MC4. The master electric device MD4 includes a master wireless communicator MW4. The master controller MC4 is electrically connected to the master wireless communicator MW4. The master wireless communicator MW4 is configured to wirelessly transmit the control signal CS4 to the wireless communicator WC4 of the motorized component FD. The controller FD2 is configured to receive the control signal CS4 from the master electric device MD4 via the wireless communicator WC4. The controller FD2 is configured to control the electric actuator FD1 based on the control signal CS4 wirelessly transmitted from the master wireless communicator MW4 of the master electric device MD4.

The master electric device MD4 includes a user interface UF4 configured to receive a user input U4. The master wireless communicator MW4 is configured to wirelessly transmit the control signal CS4 based on the user input U4 received by the user interface UF4. The user interface UF4 is electrically connected to the master controller MC4. The master controller MC4 is configured to control the master wireless communicator MW4 to wirelessly transmit the control signal CS4 in response to the user input U4. In the first embodiment, the user interface UF4 includes a switch SW4 configured to be activated in response to the user input U4. The switch SW4 is electrically connected to the master controller MC4. However, the user interface UF4 can include other structures instead of or in addition to the switch SW4.

The master controller MC4 includes a processor MC41, a memory MC42, a circuit board MC43, and a system bus MC44. The processor MC41 and the memory MC42 are electrically mounted on the circuit board MC43. The processor MC41 includes a CPU and a memory controller. The memory MC42 is electrically connected to the processor MC41. The memory MC42 includes a ROM and a RAM. The memory MC42 includes storage areas each having an address in the ROM and the RAM. The processor MC41 is configured to control the memory MC42 to store data in the storage areas of the memory MC42 and reads data from the storage areas of the memory MC42. The circuit board MC43 and the user interface UF4 are electrically connected to the system bus MC44. The circuit board MC43 and the switch SW4 are electrically connected to the system bus MC44. The use interface is electrically connected to the processor MC41 and the memory MC42 with the circuit board MC43 and the system bus MC44. The switch SW4 is electrically connected to the processor MC41 and the memory MC42 with the circuit board MC43 and the system bus MC44. The memory MC42 (e.g., the ROM) stores a program. The program is read into the processor MC41, and thereby the configuration and/or algorithm of the master electric device MD4 is performed. The master controller MC4 can also be referred to as a master controller circuit or circuitry MC4.

The master wireless communicator MW4 is electrically mounted on the circuit board MC43. The master wireless communicator MW4 is electrically connected to the processor MC41 and the memory MC42 with the circuit board MC43 and the system bus MC44. The master wireless communicator MW4 includes a signal transmitting circuit, a signal receiving circuit, and an antenna. Thus, the master wireless communicator MW4 can also be referred to as a master wireless communicator circuit or circuitry MW4.

The master wireless communicator MW4 is configured to superimpose digital signals such as the control signal CS4 on carrier wave using a predetermined wireless communication protocol to wirelessly transmit the control signal CS4. In the first embodiment, the master wireless communicator MW4 is configured to encrypt a control signal CS4 using a cryptographic key to generate encrypted wireless signals.

The master wireless communicator MW4 is configured to receives a wireless signal via the antenna. In the first embodiment, the master wireless communicator MW4 is configured to decode the wireless signal to recognize signals and/or information wirelessly transmitted from another wireless communicator. The master wireless communicator MW4 is configured to decrypt the wireless signal using the cryptographic key.

The control system 10 includes an electric power source PS4. The electric power source PS4 is configured to supply electricity to the master electric device MD4. The electric power source PS4 is configured to supply electricity to the master controller MC4 and the master wireless communicator MW4. The master electric device MD4 is configured to be electrically connected to the electric power source PS4 configured to be remotely located from the remotely located power source RPS. The master electric device MD4 includes a power-source holder PH4 configured to hold the electric power source PS4. The power-source holder PH4 is configured to be detachably and reattachably hold the electric power source PS4. The electric power source PS4 is configured to be detachably and reattachably connected to the power source holder. Examples of the electric power source PS4 include a battery (e.g., a primary battery or a secondary battery). The electric power source PS4 can include another component such as a capacitor and an electricity generation element (e.g., a piezoelectric element) instead of or in addition to the battery.

The motorized component FD further comprises a connection port CP4 to which the electric cable EC4 is configured to be detachably and reattachably connected such that the connection port CP4 is electrically connected to the at least one of the electric actuator FD1 and the controller FD2. The motorized component FD further comprises the connection port CP4 to which the electric cable EC4 is configured to be detachably and reattachably connected such that the connection port CP4 is electrically connected to the at least one of the electric actuator FD1, the wireless communicator WC4, and the controller FD2. In the first embodiment, the connection port CP4 is configured to be electrically connected to the electric actuator FD1, the wireless communicator WC4, and the controller FD2. However, the connection port CP4 can be configured to be electrically connected to only one or two of the electric actuator FD1, the wireless communicator WC4, and the controller FD2 if needed and/or desired.

The motorized component FD further comprises a first member FD3 and a second member FD4 configured to be movable relative to the first member FD3. The motorized component FD further comprises a positioning structure FD5 configured to adjustably position the first member FD3 and the second member FD4 relative to each other. The first member FD3 is configured to secured to the frame 2A (see e.g., FIG. 1). The second member FD4 includes a chain guide contactable with the chain C (see e.g., FIG. 1). The electric actuator FD1 is configured to move the second member FD4 relative to the first member FD3 to shift the chain C relative to the front sprocket assembly FS.

The motorized component FD includes a position sensor FD6 and a motor driver FD7. The electric actuator FD1 is electrically connected to the position sensor FD6 and the motor driver FD7. The electric actuator FD1 includes a rotational shaft operatively coupled to the second member FD4. The position sensor FD6 is configured to sense a current position of the second member FD4 relative to the first member FD3. Examples of the position sensor FD6 include a potentiometer and a rotary encoder. The position sensor FD6 is configured to sense an absolute rotational position of an output shaft of the electric actuator FD1 as the current position of the second member FD4 relative to the first member FD3. The motor driver FD7 is configured to control the electric actuator FD1 based on the current position of the second member FD4 relative to the first member FD3 sensed by the position sensor FD6.

As seen in FIG. 2, the motorized component LE for the human-powered vehicle 2 other than the rear derailleur RD comprises an electric actuator LE1 and a controller LE2 configured to control the electric actuator LE1. Examples of the electric actuator LE1 include a motor.

At least one of the electric actuator LE1 and the controller LE2 is configured to be electrically connected via an electric cable EC5 to the remotely located power source RPS configured to supply electricity to the assist drive unit DU configured to assist pedaling. In the first embodiment, each of the electric actuator LE1 and the controller LE2 is configured to be electrically connected to the remotely located power source RPS via the electric cable EC5. However, only one of the electric actuator LE1 and the controller LE2 can be configured to be electrically connected via the electric cable EC5 to the remotely located power source RPS if needed and/or desired.

The motorized component LE further comprises a wireless communicator WC5 electrically connected to the controller LE2. The wireless communicator WC5 is configured to wirelessly communicate with another wireless communicator of another component via a wireless communication channel. The controller LE2 is configured to receive a control signal from another component via the wireless communicator WC5. The controller LE2 is configured to receive a control signal CS5 from the master electric device MD5 via the wireless communicator WC5.

At least one of the electric actuator LE1, the wireless communicator WC5, and the controller LE2 is configured to receive electricity from the remotely located power source RPS via the electric cable EC5. In the first embodiment, each of the electric actuator LE1, the wireless communicator WC5, and the controller LE2 is configured to receive electricity from the remotely located power source RPS via the electric cable EC5. However, only one or two of the electric actuator LE1, the wireless communicator WC5, and the controller LE2 can be configured to be electrically connected via the electric cable EC5 to the remotely located power source RPS if needed and/or desired.

The controller LE2 includes a processor LE21, a memory LE22, a circuit board LE23, and a system bus LE24. The processor LE21 and the memory LE22 are electrically mounted on the circuit board LE23. The processor LE21 includes a CPU and a memory controller. The memory LE22 is electrically connected to the processor LE21. The memory LE22 includes a ROM and a RAM. The memory LE22 includes storage areas each having an address in the ROM and the RAM. The processor LE21 is configured to control the memory LE22 to store data in the storage areas of the memory LE22 and reads data from the storage areas of the memory LE22. The memory LE22 (e.g., the ROM) stores a program. The program is read into the processor LE21, and thereby the configuration and/or algorithm of the controller LE2 is performed. The controller LE2 can also be referred to as a controller circuit or circuitry LE2.

The wireless communicator WC5 is electrically mounted on the circuit board LE23. The wireless communicator WC5 is electrically connected to the processor LE21 and the memory LE22 with the circuit board LE23 and the system bus LE24. The wireless communicator WC5 includes a signal transmitting circuit, a signal receiving circuit, and an antenna. Thus, the wireless communicator WC5 can also be referred to as a wireless communicator circuit or circuitry WC5.

The wireless communicator WC5 is configured to superimpose digital signals on carrier wave using a predetermined wireless communication protocol to wirelessly transmit a control signal. In the first embodiment, the wireless communicator WC5 is configured to encrypt a control signal using a cryptographic key to generate encrypted wireless signals.

The wireless communicator WC5 is configured to receives a wireless signal via the antenna. In the first embodiment, the wireless communicator WC5 is configured to decode the wireless signal to recognize the control signal CS5 wirelessly transmitted from the master electric device MD5. The wireless communicator WC5 is configured to decrypt the control signal CS5 using the cryptographic key.

As seen in FIG. 2, the master electric device MD5 includes a master controller MC5. The master electric device MD5 includes a master wireless communicator MW5. The master controller MC5 is electrically connected to the master wireless communicator MW5. The master wireless communicator MW5 is configured to wirelessly transmit the control signal CS5 to the wireless communicator WC5 of the motorized component LE. The controller LE2 is configured to receive the control signal CS5 from the master electric device MD5 via the wireless communicator WC5. The controller LE2 is configured to control the electric actuator LE1 based on the control signal CS5 wirelessly transmitted from the master wireless communicator MW5 of the master electric device MD5.

The master electric device MD5 includes a user interface UF5 configured to receive a user input U5. The master wireless communicator MW5 is configured to wirelessly transmit the control signal CS5 based on the user input U5 received by the user interface UF5. The user interface UF5 is electrically connected to the master controller MC5. The master controller MC5 is configured to control the master wireless communicator MW5 to wirelessly transmit the control signal CS5 in response to the user input U5. In the first embodiment, the user interface UF5 includes a switch SW5 configured to be activated in response to the user input U5. The switch SW5 is electrically connected to the master controller MC5. However, the user interface UF5 can include other structures instead of or in addition to the switch SW5.

The master controller MC5 includes a processor MC51, a memory MC52, a circuit board MC53, and a system bus MC54. The processor MC51 and the memory MC52 are electrically mounted on the circuit board MC53. The processor MC51 includes a CPU and a memory controller. The memory MC52 is electrically connected to the processor MC51. The memory MC52 includes a ROM and a RAM. The memory MC52 includes storage areas each having an address in the ROM and the RAM. The processor MC51 is configured to control the memory MC52 to store data in the storage areas of the memory MC52 and reads data from the storage areas of the memory MC52. The circuit board MC53 and the user interface UF5 are electrically connected to the system bus MC54. The circuit board MC53 and the switch SW5 are electrically connected to the system bus MC54. The use interface is electrically connected to the processor MC51 and the memory MC52 with the circuit board MC53 and the system bus MC54. The switch SW5 is electrically connected to the processor MC51 and the memory MC52 with the circuit board MC53 and the system bus MC54. The memory MC52 (e.g., the ROM) stores a program. The program is read into the processor MC51, and thereby the configuration and/or algorithm of the master electric device MD5 is performed. The master controller MC5 can also be referred to as a master controller circuit or circuitry MC5.

The master wireless communicator MW5 is electrically mounted on the circuit board MC53. The master wireless communicator MW5 is electrically connected to the processor MC51 and the memory MC52 with the circuit board MC53 and the system bus MC54. The master wireless communicator MW5 includes a signal transmitting circuit, a signal receiving circuit, and an antenna. Thus, the master wireless communicator MW5 can also be referred to as a master wireless communicator circuit or circuitry MW5.

The master wireless communicator MW5 is configured to superimpose digital signals such as the control signal CS5 on carrier wave using a predetermined wireless communication protocol to wirelessly transmit the control signal CS5. In the first embodiment, the master wireless communicator MW5 is configured to encrypt a control signal CS5 using a cryptographic key to generate encrypted wireless signals.

The master wireless communicator MW5 is configured to receives a wireless signal via the antenna. In the first embodiment, the master wireless communicator MW5 is configured to decode the wireless signal to recognize signals and/or information wirelessly transmitted from another wireless communicator. The master wireless communicator MW5 is configured to decrypt the wireless signal using the cryptographic key.

The control system 10 includes an electric power source PS5. The electric power source PS5 is configured to supply electricity to the master electric device MD5. The electric power source PS5 is configured to supply electricity to the master controller MC5 and the master wireless communicator MW5. The master electric device MD5 is configured to be electrically connected to the electric power source PS5 configured to be remotely located from the remotely located power source RPS. The master electric device MD5 includes a power-source holder PH5 configured to hold the electric power source PS5. The power-source holder PH5 is configured to be detachably and reattachably hold the electric power source PS5. The electric power source PS5 is configured to be detachably and reattachably connected to the power source holder. Examples of the electric power source PS5 include a battery (e.g., a primary battery or a secondary battery). The electric power source PS5 can include another component such as a capacitor and an electricity generation element (e.g., a piezoelectric element) instead of or in addition to the battery.

The motorized component LE further comprises a connection port CP5 to which the electric cable EC5 is configured to be detachably and reattachably connected such that the connection port CP5 is electrically connected to the at least one of the electric actuator LE1 and the controller LE2. The motorized component LE further comprises the connection port CP5 to which the electric cable EC5 is configured to be detachably and reattachably connected such that the connection port CP5 is electrically connected to the at least one of the electric actuator LE1, the wireless communicator WC5, and the controller LE2. In the first embodiment, the connection port CP5 is configured to be electrically connected to the electric actuator LE1, the wireless communicator WC5, and the controller LE2. However, the connection port CP5 can be configured to be electrically connected to only one or two of the electric actuator LE1, the wireless communicator WC5, and the controller LE2 if needed and/or desired.

The motorized component LE further comprises a first member LE3 and a second member LE4 configured to be movable relative to the first member LE3. The motorized component LE further comprises a positioning structure LE5 configured to adjustably position the first member LE3 and the second member LE4 relative to each other. The first member LE3 is configured to secured to the frame 2A (see e.g., FIG. 1). The second member LE4 includes a light emitting unit configured to emit light. The light emitting unit includes a light emitting diode (LED). The controller LE2 is electrically connected to the light emitting unit of the second member LE4 to supply electricity supplied from the remotely located power source RPS. Thus, the light emitting unit of the second member LE4 is configured to be electrically connected to the remotely located power source RPS via the controller LE2 and the wired communication structure WS. The controller LE2 is configured to control a lighting state of the light emitting unit of the second member LE4 in response to the control signal CS5.

The electric actuator LE1 is configured to move the second member LE4 to change a direction in which the light emitting unit of the second member LE4 faces. The controller LE2 is configured to control the electric actuator LE1 to change the direction of the light emitting unit of the second member LE4 in response to the control signal CS5. In the first embodiment, the motorized component LE serves as a head lamp. However, the motorized component LE can serve as another lamp such as a tail lamp.

As seen in FIG. 3, the rear derailleur RD includes a derailleur actuator RD1 and a derailleur controller RD2 configured to control the derailleur actuator RD1. Examples of the derailleur actuator RD1 include a motor.

At least one of the derailleur actuator RD1 and the derailleur controller RD2 is configured to be electrically connected via an electric cable EC6 to the remotely located power source RPS. In the first embodiment, each of the derailleur actuator RD1 and the derailleur controller RD2 is configured to be electrically connected to the remotely located power source RPS via the electric cable EC6. However, only one of the derailleur actuator RD1 and the derailleur controller RD2 can be configured to be electrically connected via the electric cable EC6 to the remotely located power source RPS if needed and/or desired.

The rear derailleur RD further comprises a derailleur wireless communicator WC6 electrically connected to the derailleur controller RD2. The derailleur wireless communicator WC6 is configured to wirelessly communicate with another wireless communicator of another component via a wireless communication channel. The derailleur controller RD2 is configured to receive a control signal from another component via the derailleur wireless communicator WC6. The derailleur controller RD2 is configured to receive a shift control signal CS6 from the shift operating device MD6 via the derailleur wireless communicator WC6.

At least one of the derailleur actuator RD1, the derailleur wireless communicator WC6, and the derailleur controller RD2 is configured to receive electricity from the remotely located power source RPS via the electric cable EC6. In the first embodiment, each of the derailleur actuator RD1, the derailleur wireless communicator WC6, and the derailleur controller RD2 is configured to receive electricity from the remotely located power source RPS via the electric cable EC6. However, only one or two of the derailleur actuator RD1, the derailleur wireless communicator WC6, and the derailleur controller RD2 can be configured to be electrically connected via the electric cable EC6 to the remotely located power source RPS if needed and/or desired.

The derailleur controller RD2 includes a processor RD21, a memory RD22, a circuit board RD23, and a system bus RD24. The derailleur processor RD21 and the memory RD22 are electrically mounted on the circuit board RD23. The derailleur processor RD21 includes a CPU and a memory controller. The memory RD22 is electrically connected to the derailleur processor RD21. The memory RD22 includes a ROM and a RAM. The memory RD22 includes storage areas each having an address in the ROM and the RAM. The derailleur processor RD21 is configured to control the memory RD22 to store data in the storage areas of the memory RD22 and reads data from the storage areas of the memory RD22. The memory RD22 (e.g., the ROM) stores a program. The program is read into the derailleur processor RD21, and thereby the configuration and/or algorithm of the derailleur controller RD2 is performed. The derailleur controller RD2 can also be referred to as a derailleur controller circuit or circuitry RD2.

The derailleur wireless communicator WC6 is electrically mounted on the circuit board RD23. The derailleur wireless communicator WC6 is electrically connected to the derailleur processor RD21 and the memory RD22 with the circuit board RD23 and the system bus RD24. The derailleur wireless communicator WC6 includes a signal transmitting circuit, a signal receiving circuit, and an antenna. Thus, the derailleur wireless communicator WC6 can also be referred to as a wireless communicator circuit or circuitry WC6.

The derailleur wireless communicator WC6 is configured to superimpose digital signals on carrier wave using a predetermined wireless communication protocol to wirelessly transmit a control signal. In the first embodiment, the derailleur wireless communicator WC6 is configured to encrypt a control signal using a cryptographic key to generate encrypted wireless signals.

The derailleur wireless communicator WC6 is configured to receives a wireless signal via the antenna. In the first embodiment, the derailleur wireless communicator WC6 is configured to decode the wireless signal to recognize the shift control signal CS6 wirelessly transmitted from the shift operating device MD6. The derailleur wireless communicator WC6 is configured to decrypt the shift control signal CS6 using the cryptographic key.

As seen in FIG. 3, the shift operating device MD6 includes a shift operating controller MC6. The shift operating device MD6 includes a shift wireless communicator MW6. The shift operating controller MC6 is electrically connected to the shift wireless communicator MW6. The shift wireless communicator MW6 is configured to wirelessly transmit the shift control signal CS6 to the derailleur wireless communicator WC6 of the rear derailleur RD. The derailleur controller RD2 is configured to receive the shift control signal CS6 from the shift operating device MD6 via the derailleur wireless communicator WC6. The derailleur controller RD2 is configured to control the derailleur actuator RD1 based on the shift control signal CS6 wirelessly transmitted from the shift wireless communicator MW6 of the shift operating device MD6.

The shift operating device MD6 includes a user interface UF6 configured to receive a user input U6. The shift wireless communicator MW6 is configured to wirelessly transmit the shift control signal CS6 based on the user input U6 received by the user interface UF6. The user interface UF6 is electrically connected to the shift operating controller MC6. The shift operating controller MC6 is configured to control the shift wireless communicator MW6 to wirelessly transmit the shift control signal CS6 in response to the user input U6. In the first embodiment, the user interface UF6 includes a switch SW6 configured to be activated in response to the user input U6. The switch SW6 is electrically connected to the shift operating controller MC6. However, the user interface UF6 can include other structures instead of or in addition to the switch SW6.

The shift operating controller MC6 includes a processor MC61, a memory MC62, a circuit board MC63, and a system bus MC64. The processor MC61 and the memory MC62 are electrically mounted on the circuit board MC63. The processor MC61 includes a CPU and a memory controller. The memory MC62 is electrically connected to the processor MC61. The memory MC62 includes a ROM and a RAM. The memory MC62 includes storage areas each having an address in the ROM and the RAM. The processor MC61 is configured to control the memory MC62 to store data in the storage areas of the memory MC62 and reads data from the storage areas of the memory MC62. The circuit board MC63 and the user interface UF6 are electrically connected to the system bus MC64. The circuit board MC63 and the switch SW6 are electrically connected to the system bus MC64. The use interface is electrically connected to the processor MC61 and the memory MC62 with the circuit board MC63 and the system bus MC64. The switch SW6 is electrically connected to the processor MC61 and the memory MC62 with the circuit board MC63 and the system bus MC64. The memory MC62 (e.g., the ROM) stores a program. The program is read into the processor MC61, and thereby the configuration and/or algorithm of the shift operating device MD6 is performed. The shift operating controller MC6 can also be referred to as a shift operating controller circuit or circuitry MC6.

The shift wireless communicator MW6 is electrically mounted on the circuit board MC63. The shift wireless communicator MW6 is electrically connected to the processor MC61 and the memory MC62 with the circuit board MC63 and the system bus MC64. The shift wireless communicator MW6 includes a signal transmitting circuit, a signal receiving circuit, and an antenna. Thus, the shift wireless communicator MW6 can also be referred to as a wireless communicator circuit or circuitry MW6.

The shift wireless communicator MW6 is configured to superimpose digital signals such as the shift control signal CS6 on carrier wave using a predetermined wireless communication protocol to wirelessly transmit the shift control signal CS6. In the first embodiment, the shift wireless communicator MW6 is configured to encrypt a shift control signal CS6 using a cryptographic key to generate encrypted wireless signals.

The shift wireless communicator MW6 is configured to receives a wireless signal via the antenna. In the first embodiment, the shift wireless communicator MW6 is configured to decode the wireless signal to recognize signals and/or information wirelessly transmitted from another wireless communicator. The shift wireless communicator MW6 is configured to decrypt the wireless signal using the cryptographic key.

The control system 10 includes an electric power source PS6. The electric power source PS6 is configured to supply electricity to the shift operating device MD6. The electric power source PS6 is configured to supply electricity to the shift operating controller MC6 and the shift wireless communicator MW6. The shift operating device MD6 is configured to be electrically connected to the electric power source PS6 configured to be remotely located from the remotely located power source RPS. The shift operating device MD6 includes a power-source holder PH6 configured to hold the electric power source PS6. The power-source holder PH6 is configured to be detachably and reattachably hold the electric power source PS6. The electric power source PS6 is configured to be detachably and reattachably connected to the power source holder. Examples of the electric power source PS6 include a battery (e.g., a primary battery or a secondary battery). The electric power source PS6 can include another component such as a capacitor and an electricity generation element (e.g., a piezoelectric element) instead of or in addition to the battery.

The rear derailleur RD further comprises a connection port CP6 to which the electric cable EC6 is configured to be detachably and reattachably connected such that the connection port CP6 is electrically connected to the at least one of the derailleur actuator RD1 and the derailleur controller RD2. The rear derailleur RD further comprises the connection port CP6 to which the electric cable EC6 is configured to be detachably and reattachably connected such that the connection port CP6 is electrically connected to the at least one of the derailleur actuator RD1, the derailleur wireless communicator WC6, and the derailleur controller RD2. In the first embodiment, the connection port CP6 is configured to be electrically connected to the derailleur actuator RD1, the derailleur wireless communicator WC6, and the derailleur controller RD2. However, the connection port CP6 can be configured to be electrically connected to only one or two of the derailleur actuator RD1, the derailleur wireless communicator WC6, and the derailleur controller RD2 if needed and/or desired.

The rear derailleur RD includes a base member RD3 and a movable member RD4. The movable member RD4 is movably coupled to the base member RD3. The movable member RD4 is configured to guide the chain C. The derailleur actuator RD1 is configured to move the movable member RD4 relative to the base member RD3 to shift the chain C relative to the front sprocket assembly FS.

The rear derailleur RD includes a position sensor RD6 and a motor driver RD7. The derailleur actuator RD1 is electrically connected to the position sensor RD6 and the motor driver RD7. The derailleur actuator RD1 includes a rotational shaft operatively coupled to the movable member RD4. The position sensor RD6 is configured to sense a current position of the movable member RD4 relative to the base member RD3. Examples of the position sensor RD6 include a potentiometer and a rotary encoder. The position sensor RD6 is configured to sense an absolute rotational position of an output shaft of the derailleur actuator RD1 as the current position of the movable member RD4 relative to the base member RD3. The motor driver RD7 is configured to control the derailleur actuator RD1 based on the current position of the movable member RD4 relative to the base member RD3 sensed by the position sensor RD6.

Figure 4:
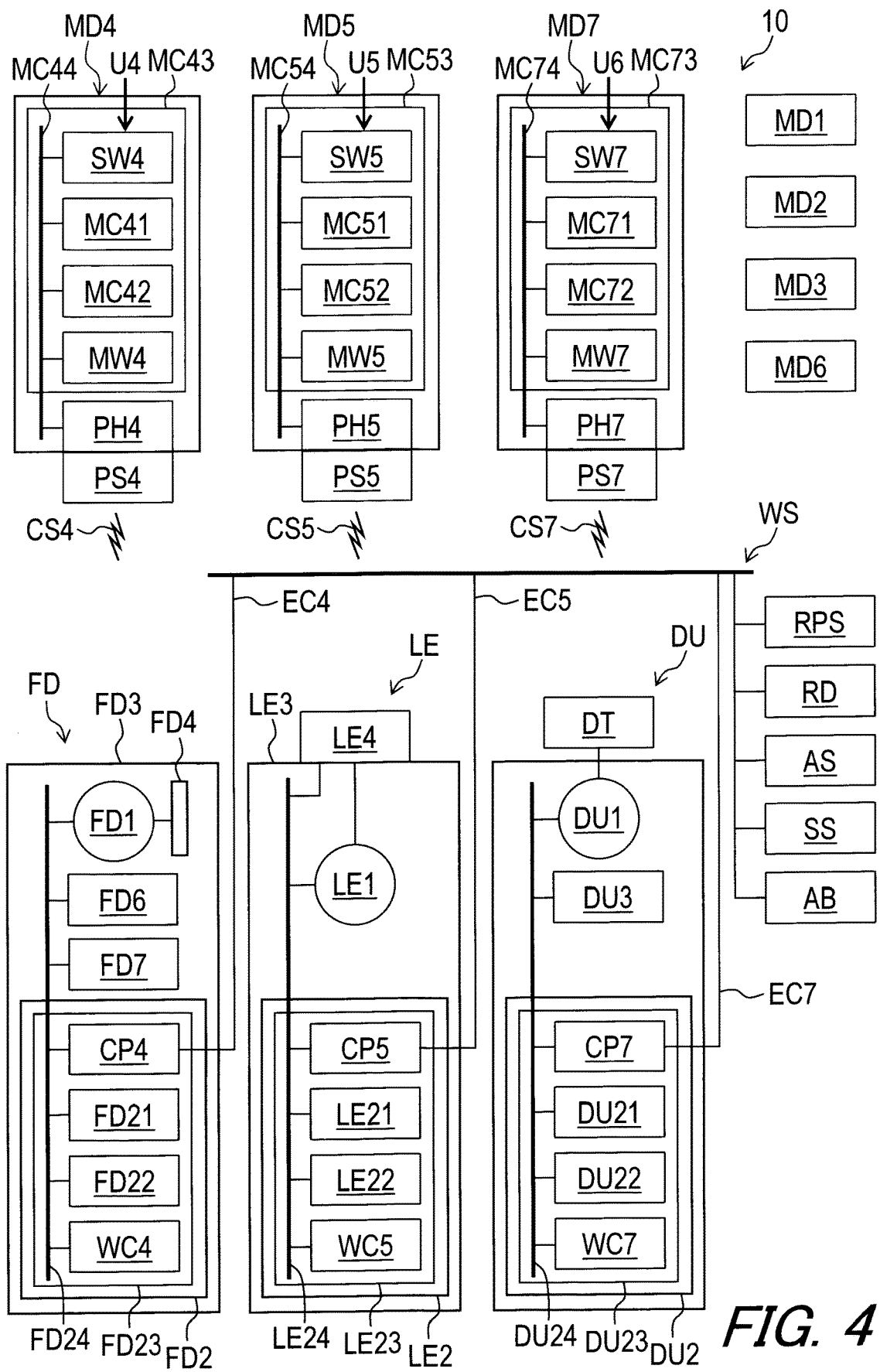
FIG. 4 is a schematic block diagram of the control system for the human-powered vehicle illustrated in FIG. 1.

As seen in FIG. 4, the assist drive unit DU includes an assist controller DU2 configured to control the assist motor DU1. At least one of the assist motor DU1 and the assist controller DU2 is configured to be electrically connected via an electric cable EC7 to the remotely located power source RPS configured to supply electricity to the assist drive unit DU configured to assist pedaling. In the first embodiment, each of the assist motor DU1 and the assist controller DU2 is configured to be electrically connected to the remotely located power source RPS via the electric cable EC7. However, only one of the assist motor DU1 and the assist controller DU2 can be configured to be electrically connected via the electric cable EC7 to the remotely located power source RPS if needed and/or desired.

The assist drive unit DU further comprises an assist wireless communicator WC7 electrically connected to the assist controller DU2. The assist wireless communicator WC7 is configured to wirelessly communicate with another assist wireless communicator of another component via a wireless communication channel. The assist controller DU2 is configured to receive a control signal from another component via the assist wireless communicator WC7. The assist controller DU2 is configured to receive an assist control signal CS7 from the assist operating device MD7 via the assist wireless communicator WC7.

At least one of the assist motor DU1, the assist wireless communicator WC7, and the assist controller DU2 is configured to receive electricity from the remotely located power source RPS via the electric cable EC7. In the first embodiment, each of the assist motor DU1, the assist wireless communicator WC7, and the assist controller DU2 is configured to receive electricity from the remotely located power source RPS via the electric cable EC7. However, only one or two of the assist motor DU1, the assist wireless communicator WC7, and the assist controller DU2 can be configured to be electrically connected via the electric cable EC7 to the remotely located power source RPS if needed and/or desired.

The assist controller DU2 includes an assist processor DU21, a memory DU22, a circuit board DU23, and a system bus DU24. The assist processor DU21 and the memory DU22 are electrically mounted on the circuit board DU23. The assist processor DU21 includes a CPU and a memory controller. The memory DU22 is electrically connected to the assist processor DU21. The memory DU22 includes a ROM and a RAM. The memory DU22 includes storage areas each having an address in the ROM and the RAM. The assist processor DU21 is configured to control the memory DU22 to store data in the storage areas of the memory DU22 and reads data from the storage areas of the memory DU22. The memory DU22 (e.g., the ROM) stores a program. The program is read into the assist processor DU21, and thereby the configuration and/or algorithm of the assist controller DU2 is performed. The assist controller DU2 can also be referred to as an assist controller circuit or circuitry DU2. The assist drive unit DU can also be referred to as an assist drive circuit or circuitry DU.

The assist wireless communicator WC7 is electrically mounted on the circuit board DU23. The assist wireless communicator WC7 is electrically connected to the assist processor DU21 and the memory DU22 with the circuit board DU23 and the system bus DU24. The assist wireless communicator WC7 includes a signal transmitting circuit, a signal receiving circuit, and an antenna. Thus, the assist wireless communicator WC7 can also be referred to as an assist wireless communicator circuit or circuitry WC7.

The assist wireless communicator WC7 is configured to superimpose digital signals on carrier wave using a predetermined wireless communication protocol to wirelessly transmit a control signal. In the first embodiment, the assist wireless communicator WC7 is configured to encrypt a control signal using a cryptographic key to generate encrypted wireless signals.

The assist wireless communicator WC7 is configured to receives a wireless signal via the antenna. In the first embodiment, the assist wireless communicator WC7 is configured to decode the wireless signal to recognize the assist control signal CS7 wirelessly transmitted from the assist operating device MD7. The assist wireless communicator WC7 is configured to decrypt the assist control signal CS7 using the cryptographic key.

As seen in FIG. 4, the assist operating device MD7 includes a master controller MC7. The assist operating device MD7 includes a master assist wireless communicator MW7. The master controller MC7 is electrically connected to the master assist wireless communicator MW7. The master assist wireless communicator MW7 is configured to wirelessly transmit the assist control signal CS7 to the assist wireless communicator WC7 of the assist drive unit DU. The assist controller DU2 is configured to receive the assist control signal CS7 from the assist operating device MD7 via the assist wireless communicator WC7. The assist controller DU2 is configured to control the assist motor DU1 based on the assist control signal CS7 wirelessly transmitted from the master assist wireless communicator MW7 of the assist operating device MD7.

The assist operating device MD7 includes an assist user interface UF7 configured to receive an assist user input U7. The master assist wireless communicator MW7 is configured to wirelessly transmit the assist control signal CS7 based on the assist user input U7 received by the assist user interface UF7. The assist user interface UF7 is electrically connected to the master controller MC7. The master controller MC7 is configured to control the master assist wireless communicator MW7 to wirelessly transmit the assist control signal CS7 in response to the assist user input U7. In the first embodiment, the assist user interface UF7 includes a switch SW7 configured to be activated in response to the assist user input U7. The switch SW7 is electrically connected to the master controller MC7. However, the assist user interface UF7 can include other structures instead of or in addition to the switch SW7.

The master controller MC7 includes a processor MC71, a memory MC72, a circuit board MC73, and a system bus MC74. The processor MC71 and the memory MC72 are electrically mounted on the circuit board MC73. The processor MC71 includes a CPU and a memory controller. The memory MC72 is electrically connected to the processor MC71. The memory MC72 includes a ROM and a RAM. The memory MC72 includes storage areas each having an address in the ROM and the RAM. The processor MC71 is configured to control the memory MC72 to store data in the storage areas of the memory MC72 and reads data from the storage areas of the memory MC72. The circuit board MC73 and the assist user interface UF7 are electrically connected to the system bus MC74. The circuit board MC73 and the switch SW7 are electrically connected to the system bus MC74. The use interface is electrically connected to the processor MC71 and the memory MC72 with the circuit board MC73 and the system bus MC74. The switch SW7 is electrically connected to the processor MC71 and the memory MC72 with the circuit board MC73 and the system bus MC74. The memory MC72 (e.g., the ROM) stores a program. The program is read into the processor MC71, and thereby the configuration and/or algorithm of the assist operating device MD7 is performed. The master controller MC7 can also be referred to as a master controller circuit or circuitry MC7.

The master assist wireless communicator MW7 is electrically mounted on the circuit board MC73. The master assist wireless communicator MW7 is electrically connected to the processor MC71 and the memory MC72 with the circuit board MC73 and the system bus MC74. The master assist wireless communicator MW7 includes a signal transmitting circuit, a signal receiving circuit, and an antenna. Thus, the master assist wireless communicator MW7 can also be referred to as a master wireless communicator circuit or circuitry MW7.

The master assist wireless communicator MW7 is configured to superimpose digital signals such as the assist control signal CS7 on carrier wave using a predetermined wireless communication protocol to wirelessly transmit the assist control signal CS7. In the first embodiment, the master assist wireless communicator MW7 is configured to encrypt an assist control signal CS7 using a cryptographic key to generate encrypted wireless signals.

The master assist wireless communicator MW7 is configured to receives a wireless signal via the antenna. In the first embodiment, the master assist wireless communicator MW7 is configured to decode the wireless signal to recognize signals and/or information wirelessly transmitted from another assist wireless communicator. The master assist wireless communicator MW7 is configured to decrypt the wireless signal using the cryptographic key.

The control system 10 includes an electric power source PS7. The electric power source PS7 is configured to supply electricity to the assist operating device MD7. The electric power source PS7 is configured to supply electricity to the master controller MC7 and the master assist wireless communicator MW7. The assist operating device MD7 is configured to be electrically connected to the electric power source PS7 configured to be remotely located from the remotely located power source RPS. The assist operating device MD7 includes a power-source holder PH7 configured to hold the electric power source PS7. The power-source holder PH7 is configured to be detachably and reattachably hold the electric power source PS7. The electric power source PS7 is configured to be detachably and reattachably connected to the power source holder. Examples of the electric power source PS7 include a battery (e.g., a primary battery or a secondary battery). The electric power source PS7 can include another component such as a capacitor and an electricity generation element (e.g., a piezoelectric element) instead of or in addition to the battery.

The assist drive unit DU further comprises a connection port CP7 to which the electric cable EC7 is configured to be detachably and reattachably connected such that the connection port CP7 is electrically connected to the at least one of the assist motor DU1 and the assist controller DU2. The assist drive unit DU further comprises the connection port CP7 to which the electric cable EC7 is configured to be detachably and reattachably connected such that the connection port CP7 is electrically connected to the at least one of the assist motor DU1, the assist wireless communicator WC7, and the assist controller DU2. In the first embodiment, the connection port CP7 is configured to be electrically connected to the assist motor DU1, the assist wireless communicator WC7, and the assist controller DU2. However, the connection port CP7 can be configured to be electrically connected to only one or two of the assist motor DU1, the assist wireless communicator WC7, and the assist controller DU2 if needed and/or desired.

As seen in FIG. 4, the assist drive unit DU includes a pedaling-force sensor DU3. The pedaling-force sensor DU3 is configured to sense a pedaling force applied to the drive train 2E from a rider. The assist controller DU2 is configured to control the assist motor DU1 to add the assist driving force to the drive train 2E based on an assist ratio and the pedaling force sensed by the pedaling-force sensor DU3. The assist controller DU2 is configured to select and/or calculate the assist ratio. However, the assist controller DU2 can be configured to control the assist motor DU1 to add the assist driving force to the drive train 2E regardless of the assist ratio and/or the pedaling force. For example, the assist controller DU2 can be configured to control the assist motor DU1 to add the assist driving force to the drive train 2E based on the assist user input U7 received by the assist operating device MD7.

The assist drive unit DU has at least two assist modes having different assist ratios. In the first embodiment, the assist drive unit DU has a first assist mode and a second assist mode. The first assist mode has a first assist ratio. The second assist mode has a second assist ratio which is lower than the first assist ratio. In the first assist mode, the assist controller DU2 is configured to calculate the assist driving force based on the first assist ratio and the pedaling force sensed by the pedaling-force sensor DU3. In the second assist mode, the assist controller DU2 is configured to calculate the assist driving force based on the second assist ratio and the pedaling force sensed by the pedaling-force sensor DU3. For example, the assist controller DU2 is configured to change the assist mode between the first assist mode and the second assist mode in response to the assist control signal CS7.

As seen in FIGS. 2 to 4, the motorized components AS, SS, AB, FD and LE, the rear derailleur RD, and the assist drive unit DU can be configured to communicate with each other via the wired communication structure WS using power line communication (PLC) technology. More specifically, each of the electric cables of the wired communication structure WS includes a ground line and a voltage line that are detachably connected to a serial bus that is formed by communication interfaces. In this embodiment, the motorized components AS, SS, AB, FD and LE, the rear derailleur RD, and the assist drive unit DU can all communicate with each other through the voltage line using the PLC technology.

The PLC technology is used for communicating between electric components. The PLC carries data on a conductor that is also used simultaneously for electric power transmission or electric power distribution to the electric components. In this embodiment, electricity is supplied from the remotely located power source RPS to the motorized components AS, SS, AB, FD and LE, the rear derailleur RD, and the assist drive unit DU via the wired communication structure WS using the PLC.

The PLC uses unique identifying information such as a unique identifier that is assigned to each of the motorized components AS, SS, AB, FD and LE, the rear derailleur RD, and the assist drive unit DU. Each of the motorized components AS, SS, AB, FD and LE, the rear derailleur RD, and the assist drive unit DU is configured to store the identifying information. Based on the identifying information, each of the motorized components AS, SS, AB, FD and LE, the rear derailleur RD, and the assist drive unit DU is configured to recognize, based on the identifying information, information signals which are necessary for itself among information signals transmitted via the wired communication structure WS. Instead of using the PLC technology, however, separate signal wires can be provided for transmitting data in addition to the ground wire and the voltage wire if needed and/or desired.

As seen in FIG. 2, the motorized component AS includes a wired communicator PC1 configured to establish a wired communication channel such as the PLC. The wired communicator PC1 is electrically mounted on the circuit board AS23. The wired communicator PC1 is connected to the wired communication structure WS and the system bus AS24. The wired communicator PC1 is configured to separate input signals to a power source voltage and control signals. The wired communicator PC1 is configured to regulate the power source voltage to a level at which the controller AS2 and the wireless communicator WC1 can properly operate. The wired communicator PC1 is further configured to superimpose output signals such as the control signal CS1 on the power source voltage applied to the wired communication structure WS from the remotely located power source RPS. The wired communicator PC1 can also be referred to as a wired communicator circuit or circuitry PC1.

The motorized component SS includes a wired communicator PC2 configured to establish a wired communication channel such as the PLC. The wired communicator PC2 is electrically mounted on the circuit board SS23. The wired communicator PC2 is connected to the wired communication structure WS and the system bus SS24. The wired communicator PC2 is configured to separate input signals to a power source voltage and control signals. The wired communicator PC2 is configured to regulate the power source voltage to a level at which the controller SS2 and the wireless communicator WC2 can properly operate. The wired communicator PC2 is further configured to superimpose output signals such as the control signal CS2 on the power source voltage applied to the wired communication structure WS from the remotely located power source RPS. The wired communicator PC2 can also be referred to as a wired communicator circuit or circuitry PC2.

The motorized component AB includes a wired communicator PC3 configured to establish a wired communication channel such as the PLC. The wired communicator PC3 is electrically mounted on the circuit board AB23. The wired communicator PC3 is connected to the wired communication structure WS and the system bus AB24. The wired communicator PC3 is configured to separate input signals to a power source voltage and control signals. The wired communicator PC3 is configured to regulate the power source voltage to a level at which the controller AB2 and the wireless communicator WC3 can properly operate. The wired communicator PC3 is further configured to superimpose output signals such as the control signal CS3 on the power source voltage applied to the wired communication structure WS from the remotely located power source RPS. The wired communicator PC3 can also be referred to as a wired communicator circuit or circuitry PC3.

As seen in FIG. 3, the motorized component FD includes a wired communicator PC4 configured to establish a wired communication channel such as the PLC. The wired communicator PC4 is electrically mounted on the circuit board FD23. The wired communicator PC4 is connected to the wired communication structure WS and the system bus FD24. The wired communicator PC4 is configured to separate input signals to a power source voltage and control signals. The wired communicator PC4 is configured to regulate the power source voltage to a level at which the controller FD2 and the wireless communicator WC4 can properly operate. The wired communicator PC4 is further configured to superimpose output signals such as the control signal CS4 on the power source voltage applied to the wired communication structure WS from the remotely located power source RPS. The wired communicator PC4 can also be referred to as a wired communicator circuit or circuitry PC4.

The motorized component LE includes a wired communicator PC5 configured to establish a wired communication channel such as the PLC. The wired communicator PC5 is electrically mounted on the circuit board LE23. The wired communicator PC5 is connected to the wired communication structure WS and the system bus LE24. The wired communicator PC5 is configured to separate input signals to a power source voltage and control signals. The wired communicator PC5 is configured to regulate the power source voltage to a level at which the controller LE2 and the wireless communicator WC5 can properly operate. The wired communicator PC5 is further configured to superimpose output signals such as the control signal CS5 on the power source voltage applied to the wired communication structure WS from the remotely located power source RPS.

The wired communicator PC5 can also be referred to as a wired communicator circuit or circuitry PC5.

The rear derailleur RD includes a wired communicator PC6 configured to establish a wired communication channel such as the PLC. The wired communicator PC6 is electrically mounted on the circuit board RD23. The wired communicator PC6 is connected to the wired communication structure WS and the system bus RD24. The wired communicator PC6 is configured to separate input signals to a power source voltage and control signals. The wired communicator PC6 is configured to regulate the power source voltage to a level at which the derailleur controller RD2 and the derailleur wireless communicator WC6 can properly operate. The wired communicator PC6 is further configured to superimpose output signals such as the shift control signal CS6 on the power source voltage applied to the wired communication structure WS from the remotely located power source RPS. The wired communicator PC6 can also be referred to as a wired communicator circuit or circuitry PC6.

As seen in FIG. 4, the assist drive unit DU includes a wired communicator PC7 configured to establish a wired communication channel such as the PLC. The wired communicator PC7 is electrically mounted on the circuit board DU23. The wired communicator PC7 is connected to the wired communication structure WS and the system bus DU24. The wired communicator PC7 is configured to separate input signals to a power source voltage and control signals. The wired communicator PC7 is configured to regulate the power source voltage to a level at which the controller DU2 and the wireless communicator WC7 can properly operate. The wired communicator PC7 is further configured to superimpose output signals such as the assist control signal CS7 on the power source voltage applied to the wired communication structure WS from the remotely located power source RPS. The wired communicator PC7 can also be referred to as a wired communicator circuit or circuitry PC7.

Second Embodiment

A control system 210 in accordance with a second embodiment will be described below referring to FIG. 5. The control system 210 has the same structure and/or configuration as those of the control system 10 except for a position of the master electric device. Thus, elements having substantially the same function as those in the first embodiment will be numbered the same here and will not be described and/or illustrated again in detail here for the sake of brevity.

Figure 5:
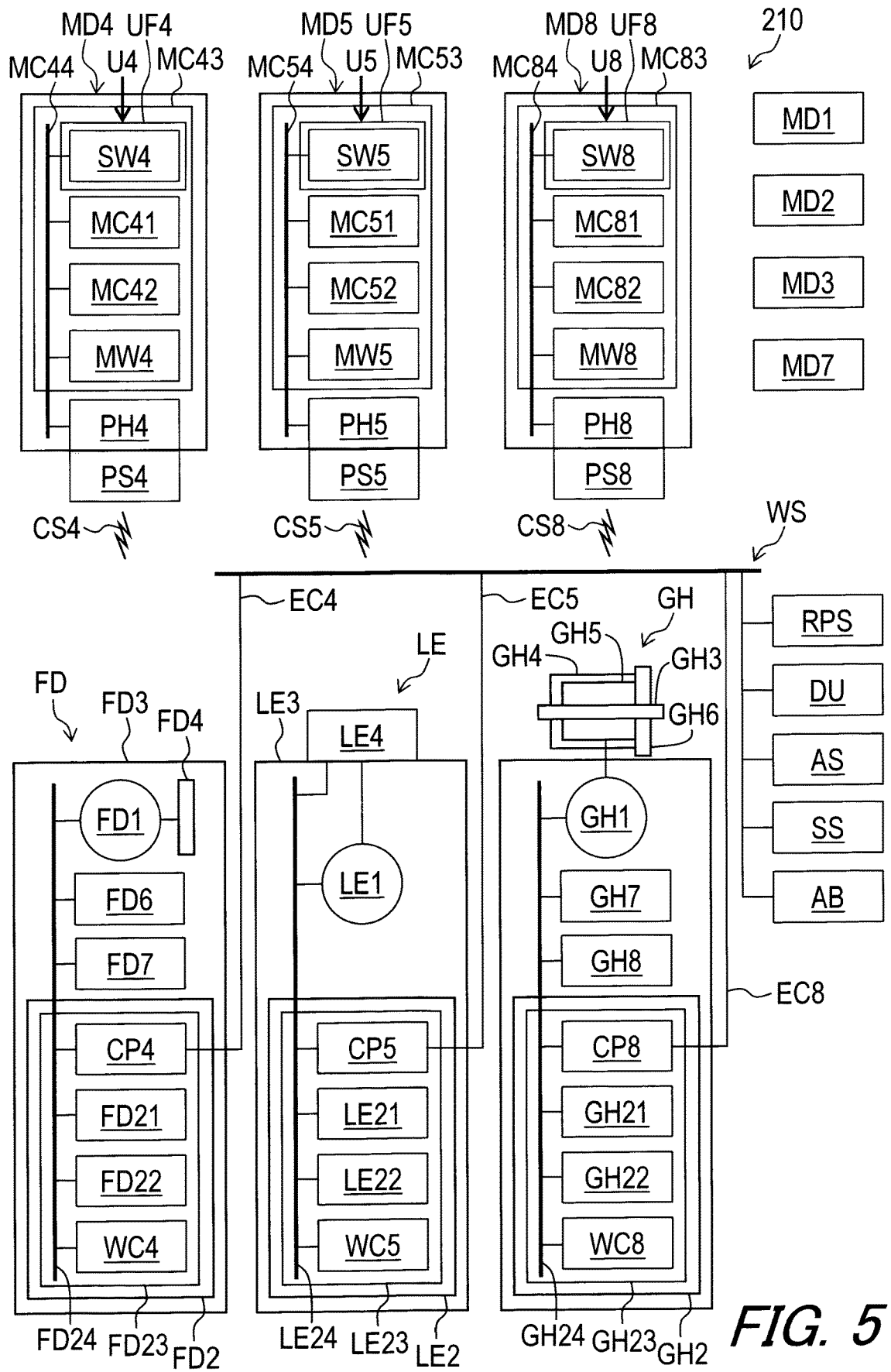
FIG. 5 is a schematic block diagram of a control system in accordance with a second embodiment.

As seen in FIG. 5, the control system 210 for the human-powered vehicle 2 comprises a motorized component and a master electric device. In the second embodiment, the control system 210 comprises the motorized component AS, the motorized component SS, the motorized component AB, the motorized component FD, the motorized component LE, and a motorized component GH. The rear derailleur RD is omitted from the human-powered vehicle 2. The rear sprocket assembly RS includes a single sprocket. The control system 210 comprises the master electric device MD1, the master electric device MD2, the master electric device MD3, the master electric device MD4, the master electric device MD5, and a master electric device MD8. The master electric device MD8 is configured to operate the internal geared hub GH.

The motorized component GH is configured to change a reduction gear ratio between the rear sprocket assembly RS and the rear wheel W2. The motorized component GH can also be referred to as an internal geared hub GH.

The motorized component GH for the human-powered vehicle 2 other than the rear derailleur RD comprises an electric actuator GH1 and a controller GH2 configured to control the electric actuator GH1.

At least one of the electric actuator GH1 and the controller GH2 is configured to be electrically connected via an electric cable EC8 to the remotely located power source RPS configured to supply electricity to the assist drive unit DU configured to assist pedaling. In the second embodiment, each of the electric actuator GH1 and the controller GH2 is configured to be electrically connected to the remotely located power source RPS via the electric cable EC8. However, only one of the electric actuator GH1 and the controller GH2 can be configured to be electrically connected via the electric cable EC8 to the remotely located power source RPS if needed and/or desired.

The motorized component GH further comprises a wireless communicator WC8 electrically connected to the controller GH2. The wireless communicator WC8 is configured to wirelessly communicate with another wireless communicator of another component via a wireless communication channel. The controller GH2 is configured to receive a control signal from another component via the wireless communicator WC8. The controller GH2 is configured to receive a control signal CS8 from the master electric device MD8 via the wireless communicator WC8.

At least one of the electric actuator GH1, the wireless communicator WC8, and the controller GH2 is configured to receive electricity from the remotely located power source RPS via the electric cable EC8. In the second embodiment, each of the electric actuator GH1, the wireless communicator WC8, and the controller GH2 is configured to receive electricity from the remotely located power source RPS via the electric cable EC8. However, only one or two of the electric actuator GH1, the wireless communicator WC8, and the controller GH2 can be configured to be electrically connected via the electric cable EC8 to the remotely located power source RPS if needed and/or desired.

The controller GH2 includes a processor GH21, a memory GH22, a circuit board GH23, and a system bus GH24. The processor GH21 and the memory GH22 are electrically mounted on the circuit board GH23. The processor GH21 includes a CPU and a memory controller. The memory GH22 is electrically connected to the processor GH21. The memory GH22 includes a ROM and a RAM. The memory GH22 includes storage areas each having an address in the ROM and the RAM. The processor GH21 is configured to control the memory GH22 to store data in the storage areas of the memory GH22 and reads data from the storage areas of the memory GH22. The memory GH22 (e.g., the ROM) stores a program. The program is read into the processor GH21, and thereby the configuration and/or algorithm of the controller GH2 is performed. The controller GH2 can also be referred to as a controller circuit or circuitry GH2.

The wireless communicator WC8 is electrically mounted on the circuit board GH23. The wireless communicator WC8 is electrically connected to the processor GH21 and the memory GH22 with the circuit board GH23 and the system bus GH24. The wireless communicator WC8 includes a signal transmitting circuit, a signal receiving circuit, and an antenna. Thus, the wireless communicator WC8 can also be referred to as a wireless communicator circuit or circuitry WC8.

The wireless communicator WC8 is configured to superimpose digital signals on carrier wave using a predetermined wireless communication protocol to wirelessly transmit a control signal. In the second embodiment, the wireless communicator WC8 is configured to encrypt a control signal using a cryptographic key to generate encrypted wireless signals.

The wireless communicator WC8 is configured to receives a wireless signal via the antenna. In the second embodiment, the wireless communicator WC8 is configured to decode the wireless signal to recognize the control signal CS8 wirelessly transmitted from the master electric device MD8. The wireless communicator WC8 is configured to decrypt the control signal CS8 using the cryptographic key.

As seen in FIG. 5, the master electric device MD8 includes a master controller MC4. The master electric device MD8 includes a master wireless communicator MW4. The master controller MC4 is electrically connected to the master wireless communicator MW4. The master wireless communicator MW4 is configured to wirelessly transmit the control signal CS8 to the wireless communicator WC8 of the motorized component GH. The controller GH2 is configured to receive the control signal CS8 from the master electric device MD5 via the wireless communicator WC8. The controller GH2 is configured to control the electric actuator GH1 based on the control signal CS8 wirelessly transmitted from the master wireless communicator MW4 of the master electric device MD8.

The master electric device MD8 includes a user interface UF8 configured to receive a user input U8. The master wireless communicator MW4 is configured to wirelessly transmit the control signal CS8 based on the user input U8 received by the user interface UF8. The user interface UF8 is electrically connected to the master controller MC4. The master controller MC4 is configured to control the master wireless communicator MW4 to wirelessly transmit the control signal CS8 in response to the user input U8. In the second embodiment, the user interface UF8 includes a switch SW4 configured to be activated in response to the user input U8. The switch SW4 is electrically connected to the master controller MC4. However, the user interface UF8 can include other structures instead of or in addition to the switch SW4.

The master controller MC4 includes a processor MC41, a memory MC42, a circuit board MC43, and a system bus MC44. The processor MC41 and the memory MC42 are electrically mounted on the circuit board MC43. The processor MC41 includes a CPU and a memory controller. The memory MC42 is electrically connected to the processor MC41. The memory MC42 includes a ROM and a RAM. The memory MC42 includes storage areas each having an address in the ROM and the RAM. The processor MC41 is configured to control the memory MC42 to store data in the storage areas of the memory MC42 and reads data from the storage areas of the memory MC42. The circuit board MC43 and the user interface UF8 are electrically connected to the system bus MC44. The circuit board MC43 and the switch SW4 are electrically connected to the system bus MC44. The use interface is electrically connected to the processor MC41 and the memory MC42 with the circuit board MC43 and the system bus MC44. The switch SW4 is electrically connected to the processor MC41 and the memory MC42 with the circuit board MC43 and the system bus MC44. The memory MC42 (e.g., the ROM) stores a program. The program is read into the processor MC41, and thereby the configuration and/or algorithm of the master electric device MD8 is performed. The master controller MC4 can also be referred to as a master controller circuit or circuitry MC4.

The master wireless communicator MW4 is electrically mounted on the circuit board MC43. The master wireless communicator MW4 is electrically connected to the processor MC41 and the memory MC42 with the circuit board MC43 and the system bus MC44. The master wireless communicator MW4 includes a signal transmitting circuit, a signal receiving circuit, and an antenna. Thus, the master wireless communicator MW4 can also be referred to as a master wireless communicator circuit or circuitry MW4.

The master wireless communicator MW4 is configured to superimpose digital signals such as the control signal CS8 on carrier wave using a predetermined wireless communication protocol to wirelessly transmit the control signal CS8. In the second embodiment, the master wireless communicator MW4 is configured to encrypt a control signal CS8 using a cryptographic key to generate encrypted wireless signals.

The master wireless communicator MW4 is configured to receives a wireless signal via the antenna. In the second embodiment, the master wireless communicator MW4 is configured to decode the wireless signal to recognize signals and/or information wirelessly transmitted from another wireless communicator. The master wireless communicator MW4 is configured to decrypt the wireless signal using the cryptographic key.

The control system 10 includes an electric power source PS8. The electric power source PS8 is configured to supply electricity to the master electric device MD8. The electric power source PS8 is configured to supply electricity to the master controller MC4 and the master wireless communicator MW4. The master electric device MD8 is configured to be electrically connected to the electric power source PS8 configured to be remotely located from the remotely located power source RPS. The master electric device MD8 includes a power-source holder PH8 configured to hold the electric power source PS8. The power-source holder PH8 is configured to be detachably and reattachably hold the electric power source PS8. The electric power source PS8 is configured to be detachably and reattachably connected to the power source holder. Examples of the electric power source PS8 include a battery (e.g., a primary battery or a secondary battery). The electric power source PS8 can include another component such as a capacitor and an electricity generation element (e.g., a piezoelectric element) instead of or in addition to the battery.

The motorized component GH further comprises a connection port CP8 to which the electric cable EC8 is configured to be detachably and reattachably connected such that the connection port CP8 is electrically connected to the at least one of the electric actuator GH1 and the controller GH2. The motorized component GH further comprises the connection port CP8 to which the electric cable EC8 is configured to be detachably and reattachably connected such that the connection port CP8 is electrically connected to the at least one of the electric actuator GH1, the wireless communicator WC8, and the controller GH2. In the second embodiment, the connection port CP8 is configured to be electrically connected to the electric actuator GH1, the wireless communicator WC8, and the controller GH2. However, the connection port CP8 can be configured to be electrically connected to only one or two of the electric actuator GH1, the wireless communicator WC8, and the controller GH2 if needed and/or desired.

The motorized component GH includes a hub axle GH3, a hub body GH4, a sprocket support body GH5, and an internal gear structure GH6. The hub axle GH3 is configured to be secured to the frame 2A. The hub body GH4 is rotatably supported by the hub axle GH3. The sprocket support body GH5 is rotatably supported by the hub axle GH3. The internal gear structure GH6 is configured to couple the sprocket support body GH5 to the hub body GH4 to define a reduction gear ratio between the sprocket support body GH5 and the hub body GH4. The electric actuator GH1 is configured to actuate the internal gear structure GH6 to change the reduction gear ratio in response to the control signal CS8. For example, the internal gear structure GH6 includes a planetary gear structure.

The motorized component GH includes a position sensor GH7 and a motor driver GH8. The electric actuator GH1 is electrically connected to the position sensor GH7 and the motor driver GH8. The electric actuator GH1 includes a rotational shaft operatively coupled to the internal gear structure GH6. The position sensor GH7 is configured to sense a current state of the internal gear structure GH6. Examples of the position sensor GH7 include a potentiometer and a rotary encoder. The position sensor GH7 is configured to sense an absolute rotational position of an output shaft of the electric actuator GH1 as the current state of the internal gear structure GH6. The motor driver GH8 is configured to control the electric actuator GH1 based on the current state of the internal gear structure GH6 sensed by the position sensor GH7.

Third Embodiment

A control system 310 in accordance with a third embodiment will be described below referring to FIG. 6. The control system 310 has the same structure and/or configuration as those of the control system 10 except for a position of the master electric device. Thus, elements having substantially the same function as those in the first embodiment will be numbered the same here and will not be described and/or illustrated again in detail here for the sake of brevity.

Figure 6:
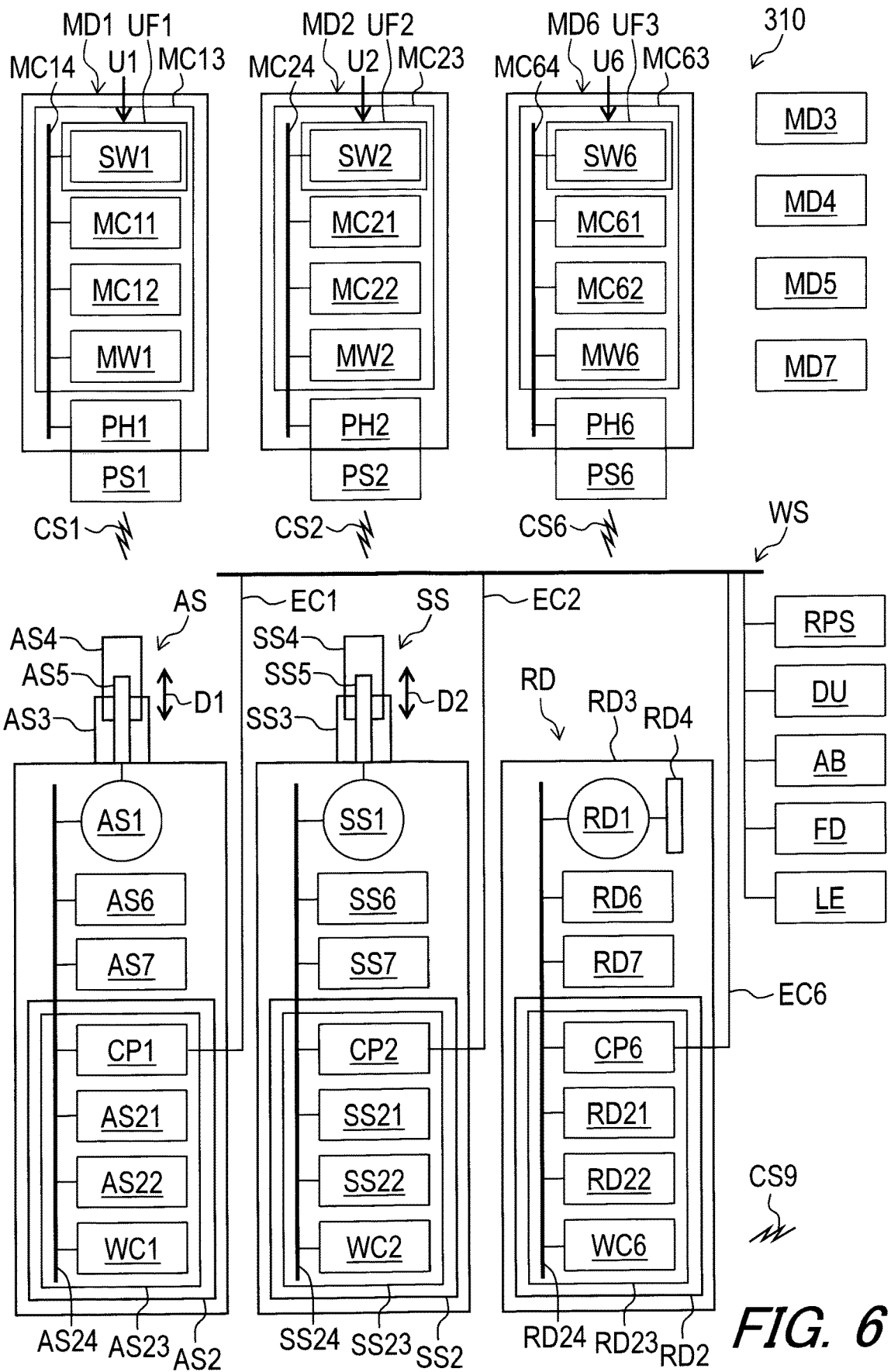
FIG. 6 is a schematic block diagram of a control system in accordance with a third embodiment.

As seen in FIG. 6, the control system 310 for the human-powered vehicle 2 comprises a motorized component and a master electric device. In the third embodiment, the control system 310 comprises the motorized component AS, the motorized component SS, the motorized component AB, the motorized component FD, and the motorized component LE.

In the control system 310, the motorized component AS for the human-powered vehicle 2 other than the rear derailleur RD comprises the electric actuator AS1 and the controller AS2 configured to control the electric actuator AS1. The motorized component AS has substantially the same structure as the structure of the motorized component AS described in the first embodiment. The motorized component AS further comprises the wireless communicator WC1 electrically connected to the controller AS2.

The motorized component AS is configured to control a slave device in response to a control signal wirelessly transmitted from another device. The wireless communicator WC1 is configured to wirelessly receive the control signal wirelessly transmitted from another device.

In the third embodiment, for example, the rear derailleur RD can also be referred to as a slave device RD. The derailleur wireless communicator WC6 can also be referred to as a slave wireless communicator WC6. The slave wireless communicator WC6 can also be referred to as a slave wireless communicator circuit or circuitry WC6. The motorized component AS is configured to control the slave device RD in response to the shift control signal CS6 wirelessly transmitted from the shift operating device MD6. The wireless communicator WC1 is configured to wirelessly receive the shift control signal CS6 wirelessly transmitted from the shift operating device MD6. The controller AS2 is configured to generate a slave control signal CS9 in response to the shift control signal CS6. The wireless communicator WC1 is configured to wirelessly transmit the slave control signal CS9 to the slave wireless communicator WC6 of the slave device RD to control the slave device RD.

The slave device RD is configured to shift the chain C in response to the slave control signal CS9. The slave wireless communicator WC6 is configured to wirelessly receive the slave control signal CS9. The slave wireless communicator WC6 is configured not to respond the shift control signal CS6 wirelessly transmitted from the shift operating device MD6. The derailleur controller RD2 is configured to control the derailleur actuator RD1 to move the movable member RD4 relative to the base member RD3.

In the third embodiment, the rear derailleur RD serves as a slave device, and the motorized component AS serves as a master device configured to control the slave device. However, at least one of the motorized components AS, SS, AB, FD and LE can be configured to serve as a master device if needed and/or desired. Another of the motorized components AS, SS, AB, FD and LE, the rear derailleur RD, and the assist drive unit DU can be configured to serve as a slave device if needed and/or desired.

Fourth Embodiment

A control system 410 in accordance with a fourth embodiment will be described below referring to FIG. 6. The control system 410 has the same structure and/or configuration as those of the control system 10 except for a position of the master electric device. Thus, elements having substantially the same function as those in the first embodiment will be numbered the same here and will not be described and/or illustrated again in detail here for the sake of brevity.

Figure 7:
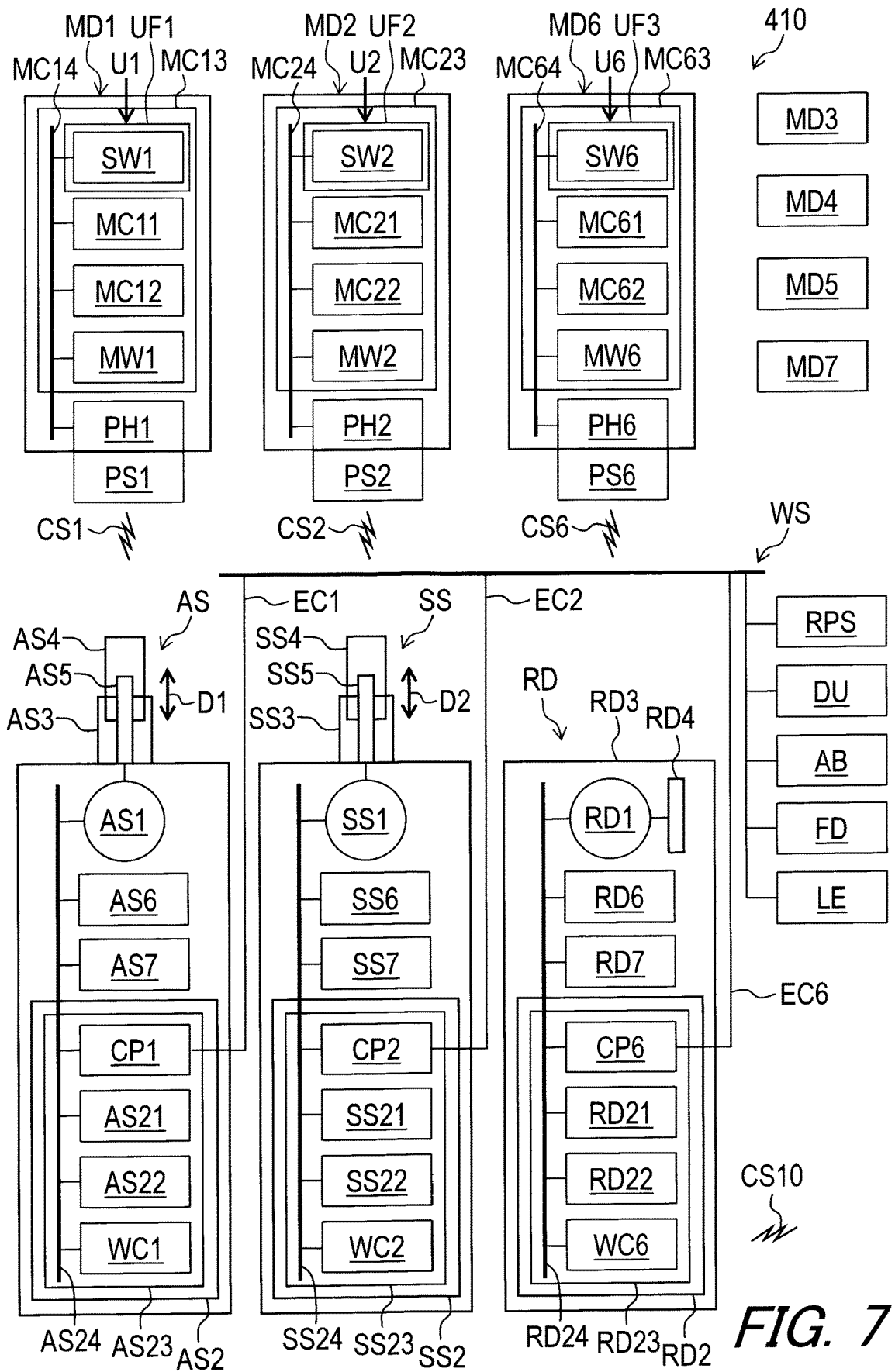
FIG. 7 is a schematic block diagram of a control system in accordance with a fourth embodiment.

As seen in FIG. 7, the control system 410 for the human-powered vehicle 2 comprises a motorized component and a master electric device. In the fourth embodiment, the control system 410 comprises the motorized component AS, the motorized component SS, the motorized component AB, the motorized component FD, and the motorized component LE.

In the control system 410, the motorized component AS for the human-powered vehicle 2 other than the rear derailleur RD comprises the electric actuator AS1 and the controller AS2 configured to control the electric actuator AS1. The motorized component AS has substantially the same structure as the structure of the motorized component AS described in the first embodiment. The motorized component AS further comprises the wireless communicator WC1 electrically connected to the controller AS2.

In the fourth embodiment, for example, the rear derailleur RD can also be referred to as a master electric device MD1. The derailleur wireless communicator WC6 of the rear derailleur RD can also be referred to as a master wireless communicator WC6. The controller AS2 is configured to control the electric actuator AS1 based on a control signal CS10 wirelessly transmitted from the master wireless communicator WC6 of the master electric device RD. The derailleur wireless communicator WC6 is configured to wirelessly receive the control signal CS1 wirelessly transmitted from the master wireless communicator MW1 of the master electric device MD1. The derailleur controller RD2 is configured to generate the control signal CS10 in response to the control signal CS1.

In the fourth embodiment, the motorized component AS serves as a slave device, and the rear derailleur RD serves as a master device configured to control the slave device. However, at least one of the motorized components AS, SS, AB, FD and LE can be configured to serve as a slave device if needed and/or desired. Another of the motorized components AS, SS, AB, FD and LE, the rear derailleur RD, and the assist drive unit DU can be configured to serve as a master device if needed and/or desired.

In the first to fourth embodiment, at least two devices of the master electric devices MD1 to MD5, the shift operating device MD6, and the assist operating device MD7 can be integrally provided with each other as a single unit. In a case where at least two devices of the master electric devices MD1 to MD5, the shift operating device MD6, and assist operating device MD7 are integrally provided with each other, the at least two devices can share at least one of an electric power source, a master controller, a master wireless communicator, a user interface, and other elements.

In the first to fourth embodiments, the control system 10, 310, or 410 includes the motorized components AS, SS, AB, FD, and LE. The control system 210 includes the motorized components AS, SS, AB, FD, LE, and GH. However, the control system 10, 210, 310, or 410 can include another motorized component if needed and/or desired. The control system 10, 210, 310, or 410 can include only one motorized component if needed and/or desired. The control system 10, 210, 310, or 410 can include only one master electric device if needed and/or desired. The control system 10, 210, 310, or 410 can include only one master controller if needed and/or desired.

In the present application, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. This concept also applies to words of similar meaning, for example, the terms "have," "include" and their derivatives.

The terms "member," "section," "portion," "part," "element," "body" and "structure" when used in the singular can have the dual meaning of a single part or a plurality of parts.

The ordinal numbers such as "first" and "second" recited in the present application are merely identifiers, but do not have any other meanings, for example, a particular order and the like. Moreover, for example, the term "first element" itself does not imply an existence of "second element," and the term "second element" itself does not imply an existence of "first element."

The term "pair of," as used herein, can encompass the configuration in which the pair of elements have different shapes or structures from each other in addition to the configuration in which the pair of elements have the same shapes or structures as each other.

The terms "a" (or "an"), "one or more" and "at least one" can be used interchangeably herein.

The phrase "at least one of" as used in this disclosure means "one or more" of a desired choice. For one example, the phrase "at least one of" as used in this disclosure means "only one single choice" or "both of two choices" if the number of its choices is two. For other example, the phrase "at least one of" as used in this disclosure means "only one single choice" or "any combination of equal to or more than two choices" if the number of its choices is equal to or more than three. For instance, the phrase "at least one of A and B" encompasses (1) A alone, (2), B alone, and (3) both A and B. The phrase "at least one of A, B, and C" encompasses (1) A alone, (2), B alone, (3) C alone, (4) both A and B, (5) both B and C, (6) both A and C, and (7) all A, B, and C. In other words, the phrase "at least one of A and B" does not mean "at least one of A and at least one of B" in this disclosure.

Finally, terms of degree such as "substantially," "about" and "approximately" as used herein mean a reasonable amount of deviation of the modified term such that the end result is not significantly changed. All of numerical values described in the present application can be construed as including the terms such as "substantially," "about" and "approximately."

Obviously, numerous modifications and variations of the present invention are possible in light of the above teachings. It is therefore to be understood that within the scope of the appended claims, the invention may be practiced otherwise than as specifically described herein.

What is claimed is:

1. A motorized component of a human-powered vehicle, the motorized component comprising:
    an electric actuator provided on the motorized component;
    controller circuitry provided on the motorized component and configured to control the electric actuator;
    at least one of the electric actuator and the controller circuitry being configured to be electrically connected via an electric cable to a remotely located power source configured to supply electricity to an assist drive unit configured to assist pedaling, the motorized component being other than a rear derailleur; and
    wireless communicator circuitry provided on the motorized component and electrically connected to the controller circuitry, the wireless communicator circuitry being configured to receive a first control signal from other wireless communicator circuitry of an other electric device different from the motorized component, wherein
    the wireless communicator circuitry wirelessly transmits a second control signal from the wireless communicator circuitry provided on the motorized component to an additional wireless communicator provided on an additional motorized component that is different from the motorized component and the other electric device, the additional motorized component including an additional electric actuator provided on the additional motorized component to control the additional electric actuator, the second control signal being based on a receipt of the first control signal,
    the motorized component further comprises:
        a first member;
        a second member configured to be movable relative to the first member, and
        a positioning structure configured to adjustably position the first member and the second member relative to each other,
    the second member includes a light emitting unit configured to emit light, and
    the electric actuator is configured to move the second member to change a direction in which the light emitting unit of the second member faces.

2. The motorized component according to claim 1, wherein
    at least one of the electric actuator, the wireless communicator circuitry, and the controller circuitry is configured to receive electricity from the remotely located power source via the electric cable.

3. The motorized component according to claim 1, wherein
the controller circuitry is configured to control the electric actuator based on the first control signal wirelessly transmitted from the other wireless communicator circuitry of the other electric device.

4. The motorized component according to claim 1, further comprising
a connection port to which the electric cable is configured to be detachably and reattachably connected such that the connection port is electrically connected to the at least one of the electric actuator, the wireless communicator circuitry, and the controller circuitry.

5. A control system of a human-powered vehicle, the control system comprising:
the motorized component according to claim 1; and
the other electric device including the other wireless communicator circuitry configured to wirelessly transmit the first control signal to the wireless communicator circuitry of the motorized component.

6. The control system according to claim 5, wherein
the other electric device includes a user interface configured to receive a user input, and
the other wireless communicator circuitry is configured to wirelessly transmit the first control signal based on the user input received by the user interface.

7. The control system according to claim 6, wherein
the user interface includes a switch configured to be activated in response to the user input.

8. The control system according to claim 5, wherein
the other electric device is configured to be electrically connected to an electric power source configured to be remotely located from the remotely located power source.

9. The control system according to claim 8, wherein
the other electric device includes a power-source holder configured to hold the electric power source.

10. The motorized component according to claim 1, wherein
the controller circuitry is electrically connected to the electric actuator.

11. A control system of a human-powered vehicle, the control system comprising:
a motorized component comprising:
an electric actuator provided on the motorized component;
controller circuitry provided on the motorized component and configured to control the electric actuator;
at least one of the electric actuator and the controller circuitry being configured to be electrically connected via an electric cable to a remotely located power source configured to supply electricity to an assist drive unit configured to assist pedaling, the motorized component being other than a rear derailleur; and
communicator circuitry provided on the motorized component and electrically connected to the controller circuitry; and
an other electric device including a user interface configured to receive a user input, and the other electric device including other wireless communicator circuitry configured to wirelessly transmit a first control signal to the communicator circuitry of the motorized component, the first control signal being transmitted based on the user input received by the user interface, the other electric device being different from the motorized component, wherein
the communicator circuitry of the motorized component transmits a second control signal from the communicator circuitry provided on the motorized component to an additional communicator provided on an additional motorized component that is different from the motorized component and the other electric device, the additional motorized component including an additional electric actuator provided on the additional motorized component to control the additional electric actuator, the second control signal being based on a receipt of the first control signal,
the motorized component further comprises:
a first member;
a second member configured to be movable relative to the first member, and
a positioning structure configured to adjustably position the first member and the second member relative to each other,
the second member includes a light emitting unit configured to emit light, and
the electric actuator is configured to move the second member to change a direction in which the light emitting unit of the second member faces.

12. The control system according to claim 11, wherein
the user interface includes a switch configured to be activated in response to the user input.

13. The control system according to claim 11, wherein
the controller circuitry is electrically connected to the electric actuator.

14. The control system according to claim 11, wherein
the additional wireless communication circuitry is configured not to respond to the first control signal wirelessly transmitted from the other wireless communicator circuitry of the other electric device.

* * * * *